(12) United States Patent
Song et al.

(10) Patent No.: US 12,707,255 B2
(45) Date of Patent: Aug. 11, 2026

(54) USER EQUIPMENT SUB-BAND FULL DUPLEX

(71) Applicant: QUALCOMM Incorporated, San Diego, CA (US)

(72) Inventors: Bongyong Song, San Diego, CA (US); Shimman Arvind Patel, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 649 days.

(21) Appl. No.: 18/194,412

(22) Filed: Mar. 31, 2023

(65) Prior Publication Data

US 2024/0334178 A1 Oct. 3, 2024

(51) Int. Cl.

| | |
|---|---|
| ***H04L 5/14*** | (2006.01) |
| ***H04L 5/00*** | (2006.01) |
| ***H04W 8/24*** | (2009.01) |

(52) U.S. Cl.

CPC ............. *H04W 8/24* (2013.01); *H04L 5/0023* (2013.01); *H04L 5/14* (2013.01)

(58) Field of Classification Search

None

See application file for complete search history.

(56) References Cited

U.S. PATENT DOCUMENTS

| | | | | |
|---|---|---|---|---|
| 2012/0257551 | A1* | 10/2012 | Diao | H04W 72/51 370/280 |
| 2021/0392674 | A1* | 12/2021 | Abotabl | H04W 52/247 |
| 2022/0078817 | A1* | 3/2022 | Zhang | H04L 27/2607 |
| 2022/0182160 | A1* | 6/2022 | Su | H04B 17/309 |
| 2023/0353334 | A1* | 11/2023 | Reda | H01Q 5/42 |
| 2023/0370240 | A1* | 11/2023 | Abotabl | H04W 72/23 |
| 2024/0114522 | A1* | 4/2024 | Cozzo | H04L 1/1854 |
| 2024/0283619 | A1* | 8/2024 | Nemeth | H04L 5/1461 |
| 2024/0381330 | A1* | 11/2024 | Gou | H04W 72/231 |
| 2025/0097917 | A1* | 3/2025 | Harada | H04W 72/0453 |
| 2025/0203588 | A1* | 6/2025 | Park | H04W 52/246 |
| 2025/0301505 | A1* | 9/2025 | Choi | H04W 74/0833 |

FOREIGN PATENT DOCUMENTS

| | | | | |
|---|---|---|---|---|
| KR | 20240044966 A | * | 4/2024 | H04L 5/0094 |
| WO | WO-2024025374 A1 | * | 2/2024 | H04L 1/0016 |

* cited by examiner

*Primary Examiner* — Khaled M Kassim
*Assistant Examiner* — Shima Wasel
(74) *Attorney, Agent, or Firm* — QUALCOMM Incorporated

(57) ABSTRACT

Various aspects of the present disclosure generally relate to wireless communication. In some aspects, a user equipment (UE) may transmit, to a network node, capability information indicating one or more sub-band full-duplex (SBFD) support conditions for the UE. The UE may communicate with the network node based at least in part on the one or more SBFD support conditions for the UE. Numerous other aspects are described.

30 Claims, 14 Drawing Sheets

| Tx & Rx panel operation condition | SBFD UE capability |
|---|---|
| Same Panel | 1. Not supported<br>2. Supported if the minimum spacing between Tx and Rx subcarriers is greater than $threshold_{SamePanel}$<br>3. Supported |
| Different Panel | 1. Not supported<br>2. Supported if the minimum spacing between Tx and Rx subcarriers is greater than $threshold_{DifferentPanel}$<br>3. Supported |

700

725

700

745

750

Rx

Tx

UE 120

Rx

Tx

UE 120

755

| Tx & Rx panel operation condition | SBFD UE capability |
| --- | --- |
| Same Panel | 1. Not supported<br>2. Supported if the minimum spacing between Tx and Rx subcarriers is greater than $threshold_{SamePanel}$<br>3. Supported |
| Different Panel | 1. Not supported<br>2. Supported if the minimum spacing between Tx and Rx subcarriers is greater than $threshold_{DifferentPanel}$<br>3. Supported |

| UL channel | SBFD UE capability |
|---|---|
| PUCCH (High priority) | 1. Not supported<br>2. Supported |
| PUCCH (Regular priority) | 1. Not supported<br>2. Supported |
| PUSCH (High priority) | 1. Not supported<br>2. Supported |
| PUSCH (Regular priority) | 1. Not supported<br>2. Supported |

USER EQUIPMENT SUB-BAND FULL DUPLEX

FIELD OF THE DISCLOSURE

Aspects of the present disclosure generally relate to wireless communication and to techniques and apparatuses for user equipment (UE) sub-band full-duplex (SBFD) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit, to a network node, capability information indicating one or more sub-band full-duplex (SBFD) support conditions for the UE. The one or more processors may be configured to communicate with the network node based at least in part on the one or more SBFD support conditions for the UE.

Some aspects described herein relate to a network node for wireless communication. The network node may include a memory and one or more processors coupled to the memory. The one or more processors may be configured to receive capability information indicating one or more SBFD support conditions for a UE. The one or more processors may be configured to communicate with the UE based at least in part on the one or more SBFD support conditions for the UE.

Some aspects described herein relate to a method of wireless communication performed by a UE. The method may include transmitting, to a network node, capability information indicating one or more SBFD support conditions for the UE. The method may include communicating with the network node based at least in part on the one or more SBFD support conditions for the UE.

Some aspects described herein relate to a method of wireless communication performed by a network node. The method may include receiving capability information indicating one or more SBFD support conditions for a UE. The method may include communicating with the UE based at least in part on the one or more SBFD support conditions for the UE.

Some aspects described herein relate to a non-transitory computer-readable medium that stores a set of instructions for wireless communication by a UE. The set of instructions, when executed by one or more processors of the UE, may cause the UE to transmit, to a network node, capability information indicating one or more SBFD support conditions for the UE. The set of instructions, when executed by one or more processors of the UE, may cause the UE to communicate with the network node based at least in part on the one or more SBFD support conditions for the UE.

Some aspects described herein relate to a non-transitory computer-readable medium that stores a set of instructions for wireless communication by a network node. The set of instructions, when executed by one or more processors of the network node, may cause the network node to receive capability information indicating one or more SBFD support conditions for a UE. The set of instructions, when executed by one or more processors of the network node, may cause the network node to communicate with the UE based at least in part on the one or more SBFD support conditions for the UE.

Some aspects described herein relate to an apparatus for wireless communication. The apparatus may include means for transmitting, to a network node, capability information indicating one or more SBFD support conditions. The apparatus may include means for communicating with the network node based at least in part on the one or more SBFD support conditions.

Some aspects described herein relate to an apparatus for wireless communication. The apparatus may include means for receiving capability information indicating one or more SBFD support conditions for a UE. The apparatus may include means for communicating with the UE based at least in part on the one or more SBFD support conditions for the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7D are diagrams illustrating an example associated with UE SBFD communications, in accordance with the present disclosure.

DETAILED DESCRIPTION

Figure 1:
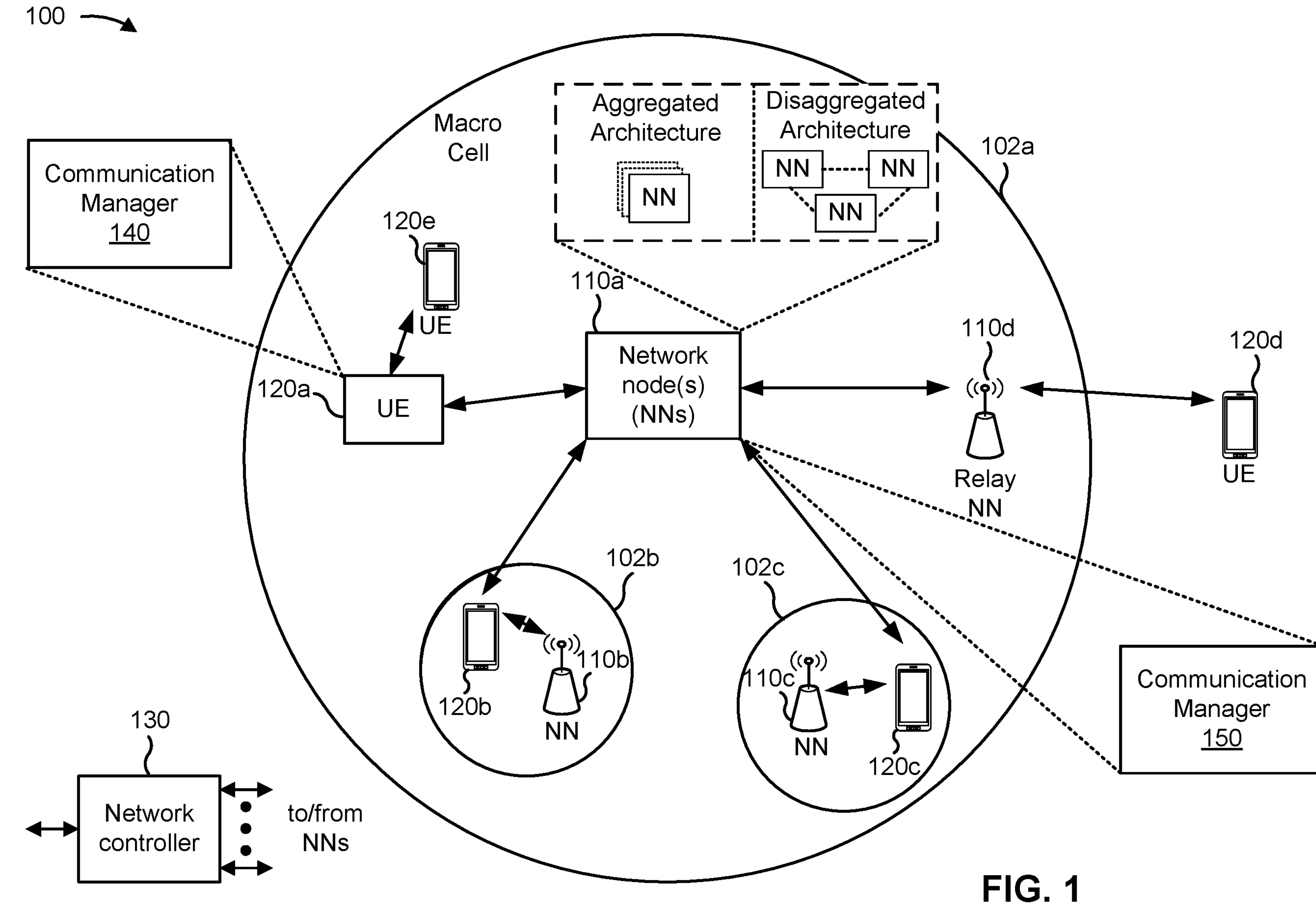
FIG. 1 is a diagram illustrating an example of a wireless network, in accordance with the present disclosure.

"Full-duplex (FD) communication" in a wireless network refers to simultaneous bi-directional communication between devices in the wireless network. For example, a user equipment (UE) operating in an FD mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol). Sub-band full-duplex (SBFD) is an FD mode in which a device (e.g., a UE) may transmit a communication and receive a communication at the same time, but on different frequency resources.

In some examples, when a device is operating in an FD mode, a transmission of a communication from the device may self-interfere with a contemporaneous reception of a communication to the device. Suppression and/or cancellation of such self-interference is a challenge associated with SBFD operation. Suppression and/or cancellation of self-interference may be particularly challenging for a UE operating in an SBFD mode due to a small form factor and/or a limited processing power. However, different UEs may have different physical characteristics (e.g., number of antenna panels and/or location of antenna panels) and different hardware and/or processing capabilities, and thus, may have different capabilities for suppressing and/or cancelling self-interference in SBFD communications. Accordingly, different UEs may be capable of supporting SBFD communications under different conditions. Thus, a network node may schedule SBFD communications for UEs, but it is unpredictable whether the UEs will be able to sufficiently suppress and/or cancel self-interference in the scheduled SBFD communications. This may result in reduced reliability and/or reduced traffic throughput for SBFD communications.

Some techniques and apparatuses described herein enable a UE to transmit, to a network node, capability information that indicates one or more SBFD support conditions for the UE. For example, the SBFD support conditions may indicate conditions, rules, and/or restrictions for the UE supporting SBFD operation. The network node and the UE may communicate based at least in part on the one or more SBFD support conditions. For example, the network node and the UE may communicate via SBFD communications in a slot (e.g., an SBFD slot) in accordance with the one or more SBFD support conditions being satisfied. In some aspects, the SBFD support conditions may be based at least in part on whether the UE uses a same antenna panel or different antenna panels for downlink reception and uplink transmission, a separation between subcarriers used for downlink reception and uplink transmission, a priority and/or type of the uplink transmission, and/or uplink and/or downlink transmission parameters for the SBFD communications. In this way, the UE may be scheduled with SBFD communications when the SBFD support conditions for the UE are satisfied, which may result in increased reliability of SBFD communications (e.g., due to reduced self-interference) and increased traffic throughput.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, capability information indicating one or more SBFD support conditions for the UE; and communicate with the network node based at least in part on the one or more SBFD support conditions for the UE. Additionally, or alternatively, the communication manager 140 may perform one or more other operations described herein.

In some aspects, the network node 110 may include a communication manager 150. As described in more detail elsewhere herein, the communication manager 150 may receive capability information indicating one or more SBFD support conditions for a UE; and communicate with the UE based at least in part on the one or more SBFD support conditions for the UE. Additionally, or alternatively, the communication manager 150 may perform one or more other operations described herein.

As indicated above, FIG. 1 is provided as an example. Other examples may differ from what is described with regard to FIG. 1.

Figure 2:
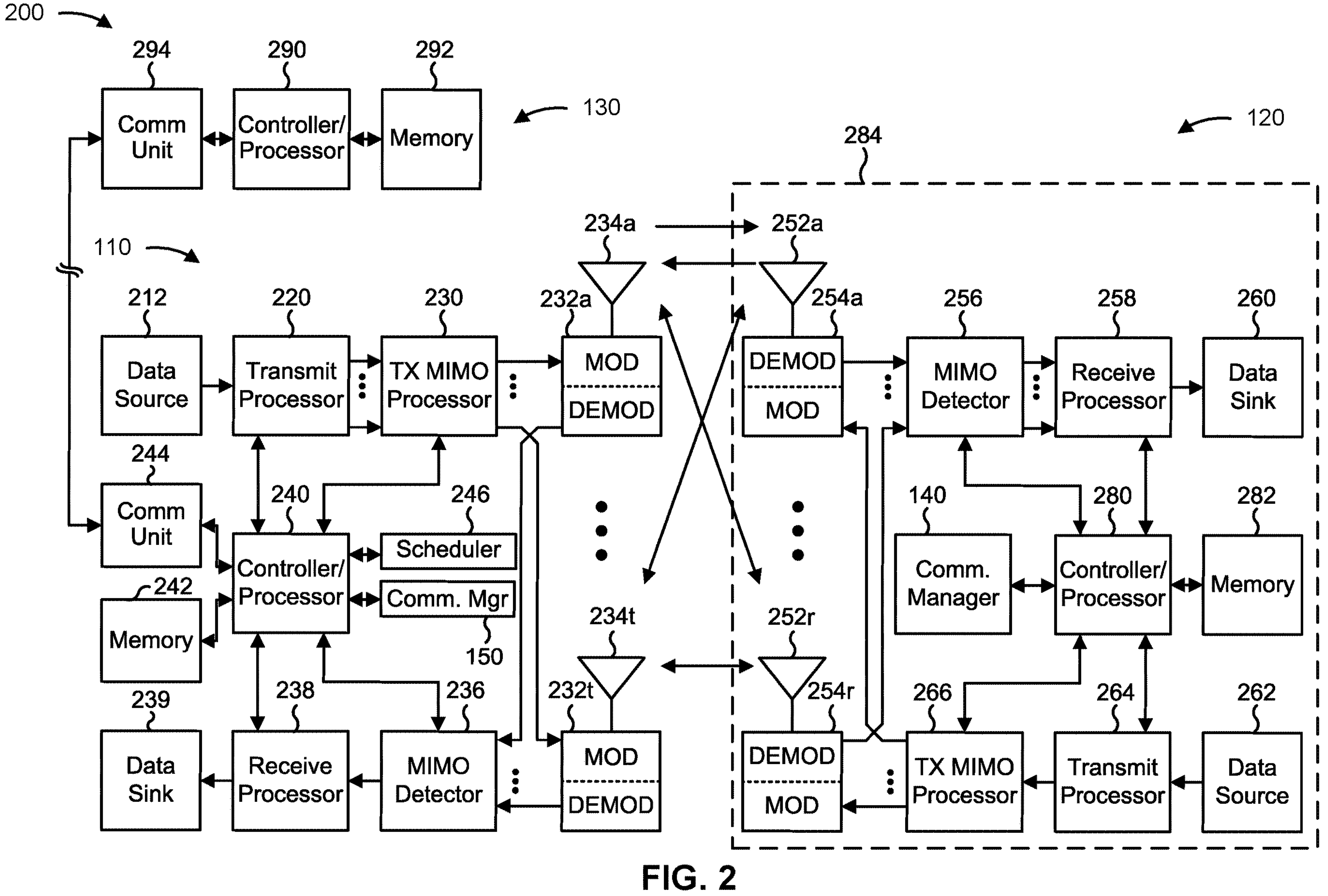
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and May provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-7D and 8-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-7D and 8-11).

The controller/processor 240 of the network node 110, the controller/processor 280 of the UE 120, and/or any other component(s) of FIG. 2 may perform one or more techniques associated with UE SBFD communications, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, to a network node, capability information indicating one or more SBFD support conditions for the UE; and/or means for communicating with the network node based at least in part on the one or more SBFD support conditions for the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving capability information indicating one or more SBFD support conditions for a UE; and/or means for communicating with the UE based at least in part on the one or more SBFD support conditions for the UE. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, May be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
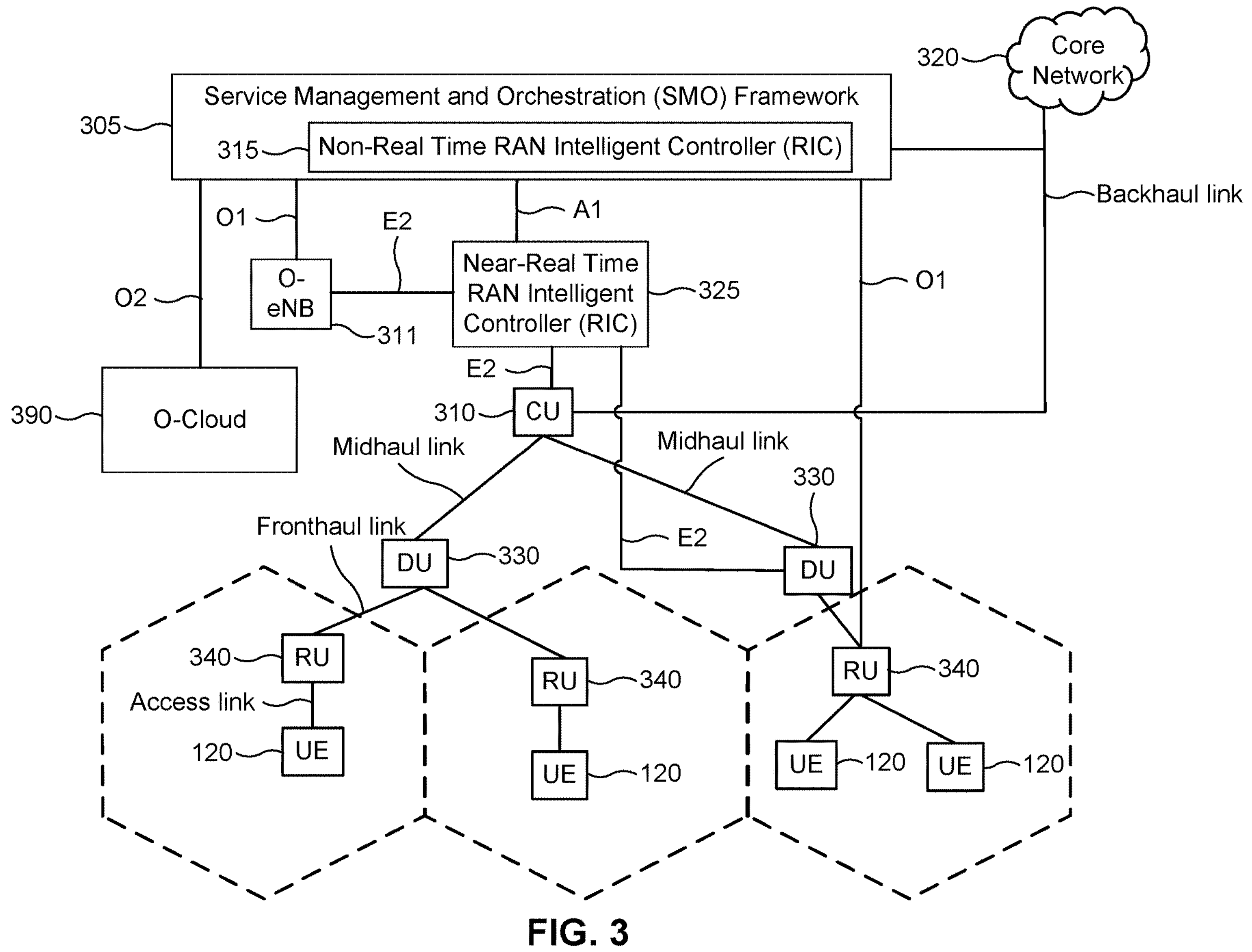
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4B:
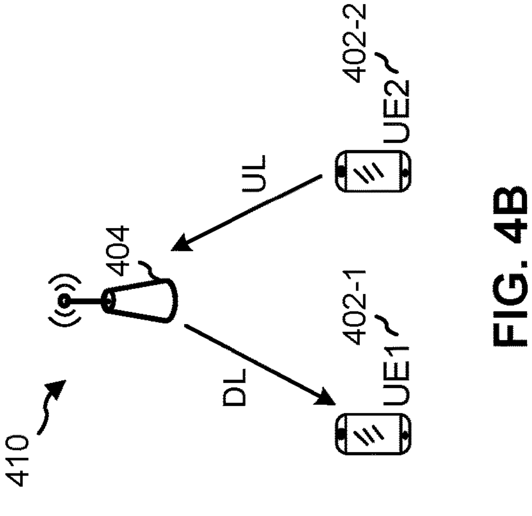
FIGS. 4A-4C are diagrams illustrating examples of full duplex (FD) communication in accordance with the present disclosure.
Figure 4C:
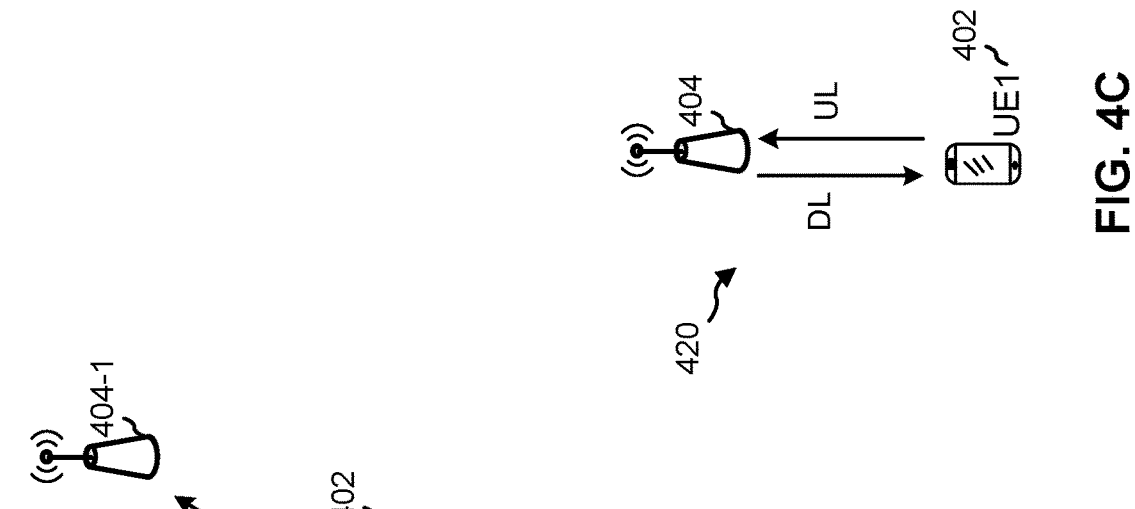
Figure 4A:
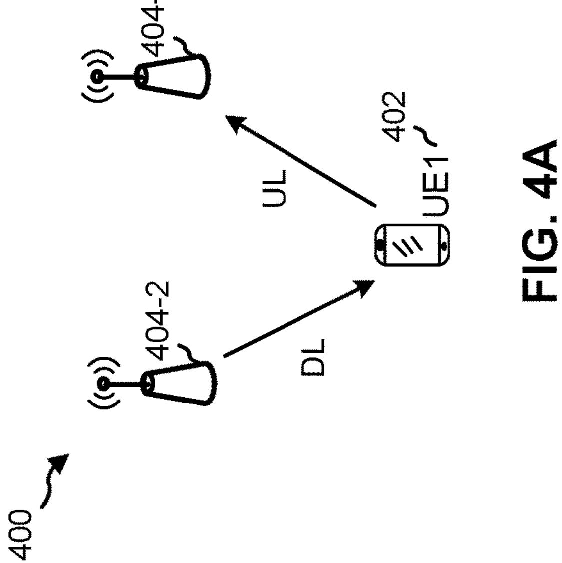

FIGS. 4A-4C are diagrams illustrating examples 400, 410, 420 of FD communication in accordance with the present disclosure. The example 400 of FIG. 4A includes a UE1 402 and two network nodes (e.g., TRPs) 404-1, 404-2, where the UE1 402 is sending UL transmissions to the network node 404-1 and is receiving DL transmissions from the network node 404-2. In the example 400 of FIG. 4A, FD is enabled for the UE1 402, but not for the network nodes 404-1, 404-2. The example 410 of FIG. 4B includes two UEs, shown as UE1 402-1 and UE2 402-2, and a network node 404, where the UE1 402-1 is receiving a DL transmission from the network node 404 and the UE2 402-2 is transmitting an UL transmission to the network node 404. In the example 410 of FIG. 4B, FD is enabled for the network node 404, but not for the UE1 402-1 and the UE2 402-2. The example 420 of FIG. 4C includes a UE1 402 and a network node 404, where the UE1 402 is receiving a DL transmission from the network node 404 and the UE1 402 is transmitting an UL transmission to the network node 404. In the example 420 of FIG. 4C, FD is enabled for both the UE1 402 and the network node 404.

As indicated above, FIGS. 4A-4C are provided as one or more examples. Other examples may differ from what is described with regard to FIGS. 4A-4C.

Figure 5:
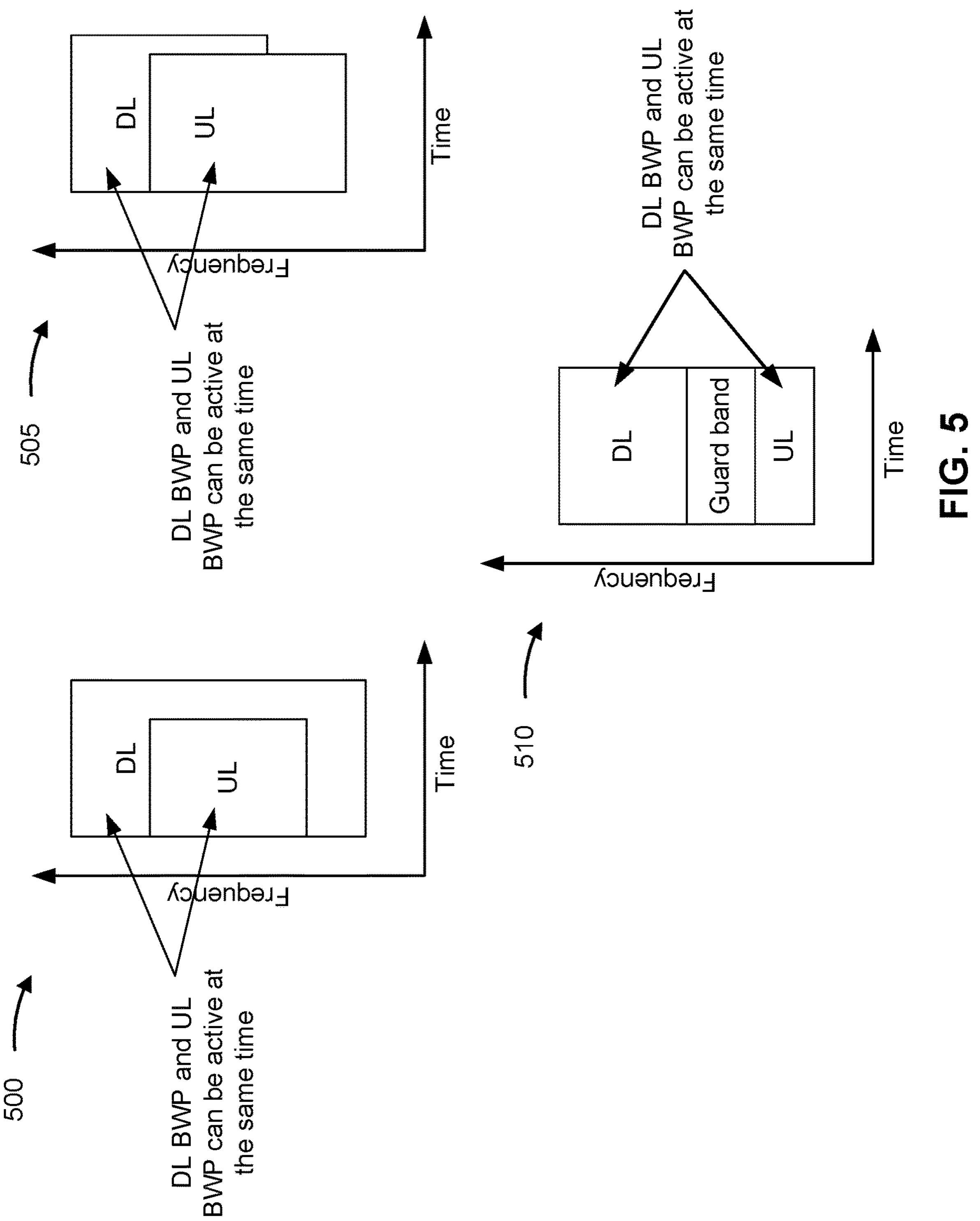
FIG. 5 is a diagram illustrating examples of FD communication in a wireless network, in accordance with the present disclosure.

FIG. 5 is a diagram illustrating examples 500, 505, and 510 of FD communication in a wireless network, in accordance with the present disclosure. As shown in FIG. 5, examples 500 and 505 show examples of in-band full-duplex (IBFD) communication. In IBFD, a UE may transmit an uplink communication to a network node and receive a downlink communication from the network node on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, example 510 shows an example of SBFD communication, which may also be referred to as "sub-band frequency division duplex (SBFDD)" or "flexible duplex." In SBFD, a UE may transmit an uplink communication to a network node and receive a downlink communication from the network node at the same time, but on different frequency resources. For example, the different frequency resources may be subbands of a frequency band, such as a time division duplexing (TDD) band. In this case, the frequency resources used for downlink communication may be separated from the frequency resources used for uplink communication, in the frequency domain, by a guard band.

As indicated above, FIG. 5 is provided as an example. Other examples may differ from what is described with respect to FIG. 5.

Figure 6:
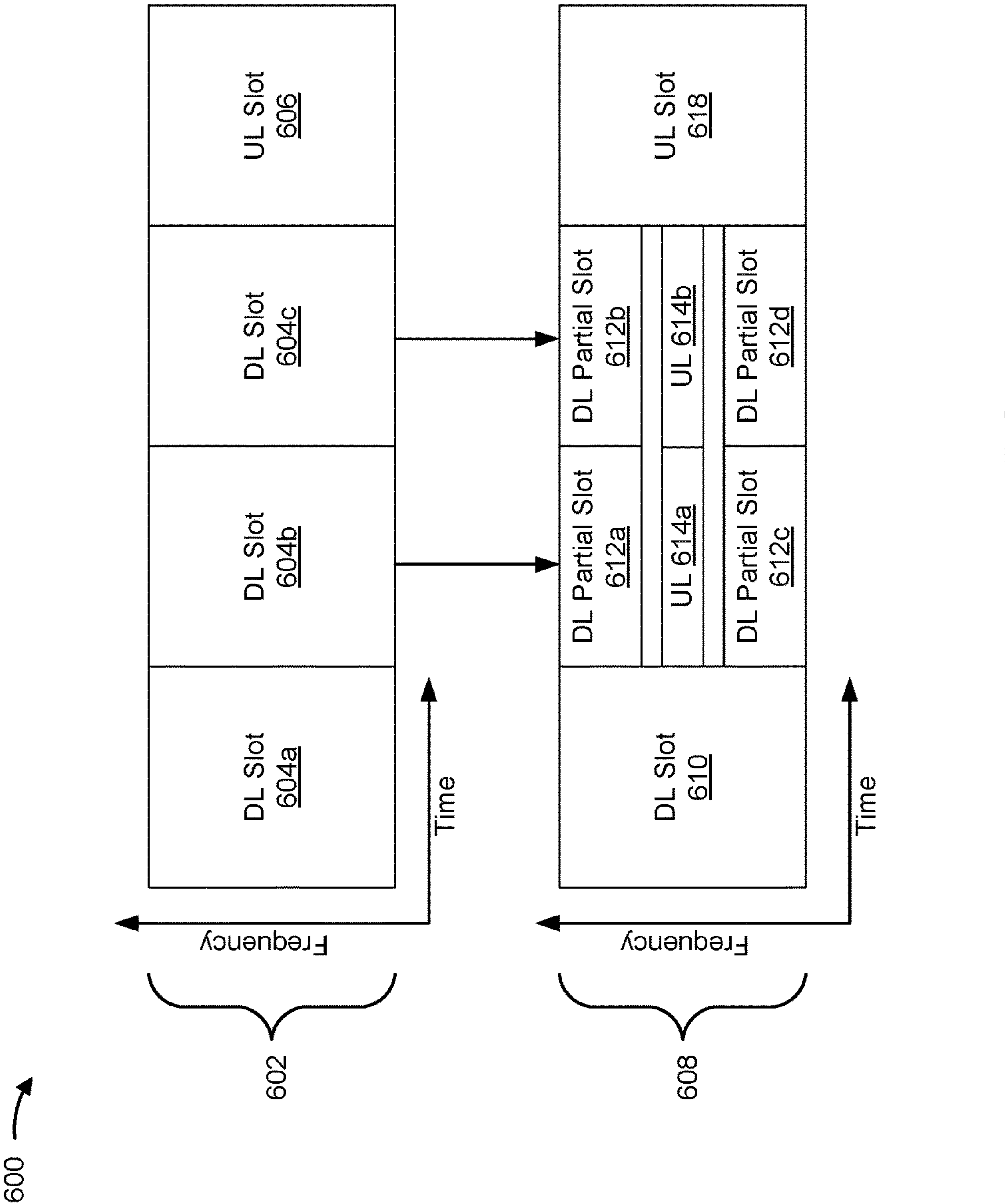
FIG. 6 is a diagram illustrating an example of sub-band FD (SBFD) activation, in accordance with the present disclosure.

FIG. 6 is a diagram illustrating an example 600 of SBFD activation, in accordance with the present disclosure. As shown in FIG. 6, example 600 includes a first configuration 602. In some aspects, the first configuration 602 may indicate a first slot format pattern (sometimes called a TDD pattern) associated with a half-duplex mode or an FD mode. The first slot format pattern may include a quantity of downlink slots (e.g., three downlink slots 604*a*, 604*b*, and 604*c*, as shown), a quantity of flexible slots (not shown), and/or a quantity of uplink slots (e.g., one uplink slot 606, as shown). The first slot format pattern may repeat over time. In some aspects, a network node 110 may indicate the first slot format pattern to a UE 120 using one or more slot format indicators. A slot format indicator, for a slot, may indicate whether that slot is an uplink slot, a downlink slot, or a flexible slot, among other examples.

A network node 110 may instruct (e.g., using an indication, such as an RRC message, a MAC control element MAC-CE, or downlink control information (DCI)) a UE 120 to switch from the first configuration 602 to a second configuration 608. As an alternative, the UE 120 may indicate to the network node 110 that the UE 120 is switching from the first configuration 602 to the second configuration 608. The second configuration 608 may indicate a second slot format pattern that repeats over time, similar to the first slot format pattern. In any of the aspects described above, the UE 120 may switch from the first configuration 602 to the second configuration 608 during a time period (e.g., a quantity of symbols and/or an amount of time (e.g., in ms)) based at least in part on an indication received from the network node 110 (e.g., before switching back to the first configuration 602). During that time period, the UE 120 may communicate using the second slot format pattern, and then may revert to using the first slot format pattern after the end of the time period. The time period may be indicated by the network node 110 (e.g., in the instruction to switch from the first configuration 602 to the second configuration 608, as described above) and/or based at least in part on a programmed and/or otherwise preconfigured rule. For example, the rule may be based at least in part on a table (e.g., defined in 3GPP specifications and/or another wireless communication standard) that associates different sub-carrier spacings (SCSs) and/or numerologies (e.g., represented by u and associated with corresponding SCSs) with corresponding time periods for switching configurations.

In example 600, the second slot format pattern includes a downlink slot 610, an uplink slot 618, and two SBFD slots in place of what were downlink slots in the first slot format pattern. In example 600, each SBFD slot includes a partial slot (e.g., a portion or sub-band of a frequency allocated for use by the network node 110 and the UE 120) for downlink (e.g., partial slots 612*a*, 612*b*, 612*c*, and 612*d*, as shown) and a partial slot for uplink (e.g., partial slots 614*a* and 614*b*, as shown). Accordingly, the UE 120 may operate using the second slot format pattern to transmit an uplink communication in an earlier slot (e.g., the second slot in sequence, shown as partial UL slot 614*a*) as compared to using the first slot format pattern (e.g., the fourth slot in sequence, shown as UL slot 606). Other examples may include additional or alternative changes. For example, the second configuration 608 may indicate an SBFD slot in place of what was an uplink slot in the first configuration 602 (e.g., UL slot 606). In another example, the second configuration 608 may indicate a downlink slot or an uplink slot in place of what was an SBFD slot in the first configuration 602 (not shown in FIG. 6). In yet another example, the second configuration 608 may indicate a downlink slot or an uplink slot in place of what was an uplink slot or a downlink slot, respectively, in the first configuration 602. An "SBFD slot" may refer to a slot in which an SBFD format is used. An SBFD format may include a slot format in which FD communication is supported (e.g., for both uplink and downlink communications), with one or more frequencies used for an uplink portion of the slot being separated from one or more frequencies used for a downlink portion of the slot by a guard band. In some examples, the SBFD format may include a single uplink portion and a single downlink portion separated by a guard band. In some examples, the SBFD format may include multiple downlink portions and a single uplink portion that is separated from the multiple downlink portions by respective guard bands (e.g., as shown in FIG. 6). In some examples, an SBFD format may include multiple uplink portions and a single downlink portion that is separated from the multiple uplink portions by respective guard bands. In some examples, the SBFD format may include multiple uplink portions and multiple downlink portions, where each uplink portion is separated from a downlink portion by a guard band. In some examples, operating using an SBFD mode may include activating or using an FD mode in one or more slots based at least in part on the one or more slots having the SBFD format. A slot may support the SBFD mode if an uplink bandwidth part (BWP) and a downlink BWP are permitted to be or are simultaneously active in the slot in an SBFD fashion (e.g., with guard band separation).

By switching from the first configuration 602 to the second configuration 608, the network node 110 and the UE 120 may experience increased quality and/or reliability of communications. For example, the network node 110 and the UE 120 May experience increased throughput (e.g., using an FD mode), reduced latency (e.g., the UE 120 may be able to transmit an uplink and/or receive a downlink communication sooner using the second configuration 608 rather than the first configuration 602), and increased network resource utilization (e.g., by using both the downlink BWP and the uplink BWP simultaneously instead of only the downlink BWP or the uplink BWP).

As indicated above, FIG. 6 is provided as an example. Other examples may differ from what is described with respect to FIG. 6.

In some examples, when a wireless communication device operating in an FD mode, a transmission of a communication from the wireless communication device may self-interfere with a contemporaneous reception (e.g., in the same slot or symbol) of a communication to the wireless communication device. Suppression and/or cancellation of such self-interference is a challenge associated with SBFD operation. Suppression and/or cancellation of self-interference may be particularly challenging for a UE operating in an SBFD mode due to a small form factor and/or a limited processing power. For example, there may be a high amount of leakage from a transmitter of a UE to a receiver of the UE due to limited physical separation of transmit (Tx) and receive (Rx) paths (e.g., limited or no physical separation between antenna panels used to transmit and receive). Furthermore, a UE may have limited hardware and/or processing power for self-interference cancellation and/or suppression in the digital and/or analog domains. Some UEs may benefit from multiple antenna panels to enable physical separation of antennas used for downlink reception and antennas used for uplink transmission in order to reduce self-interference in SBFD communications. However, different UEs may have different physical characteristics (e.g., number of antenna panels and/or location of antenna panels) and different hardware and processing capabilities, and thus, may have different capabilities for suppressing and/or cancelling self-interference in SBFD communications. Accordingly, different UEs may be capable of supporting SBFD communications under different conditions. Thus, a network node may schedule SBFD communications for UEs, but it is unpredictable whether the UEs will be able to sufficiently suppress and/or cancel self-interference in the scheduled SBFD communications. This may result in reduced reliability and/or reduced traffic throughput for SBFD communications.

Some techniques and apparatuses described herein enable a UE to transmit, to a network node, capability information that indicates one or more SBFD support conditions for the UE. For example, the SBFD support conditions may indicate conditions, rules, and/or restrictions for the UE supporting SBFD operation. The network node and the UE may communicate based at least in part on the one or more SBFD support conditions. For example, the network node and the UE may communicate via SBFD communications in a slot (e.g., an SBFD slot) in accordance with the one or more SBFD support conditions being satisfied. In some aspects, the SBFD support conditions may be based at least in part on whether the UE uses a same antenna panel or different antenna panels for downlink reception and uplink transmission, a separation between subcarriers used for downlink reception and uplink transmission, a priority and/or type of the uplink transmission, and/or uplink and/or downlink transmission parameters for the SBFD communications. In this way, the UE may be scheduled with SBFD communications when the SBFD support conditions for the UE are satisfied, which may result in increased reliability of SBFD communications (e.g., due to reduced self-interference) and increased traffic throughput.

Figure 7A:
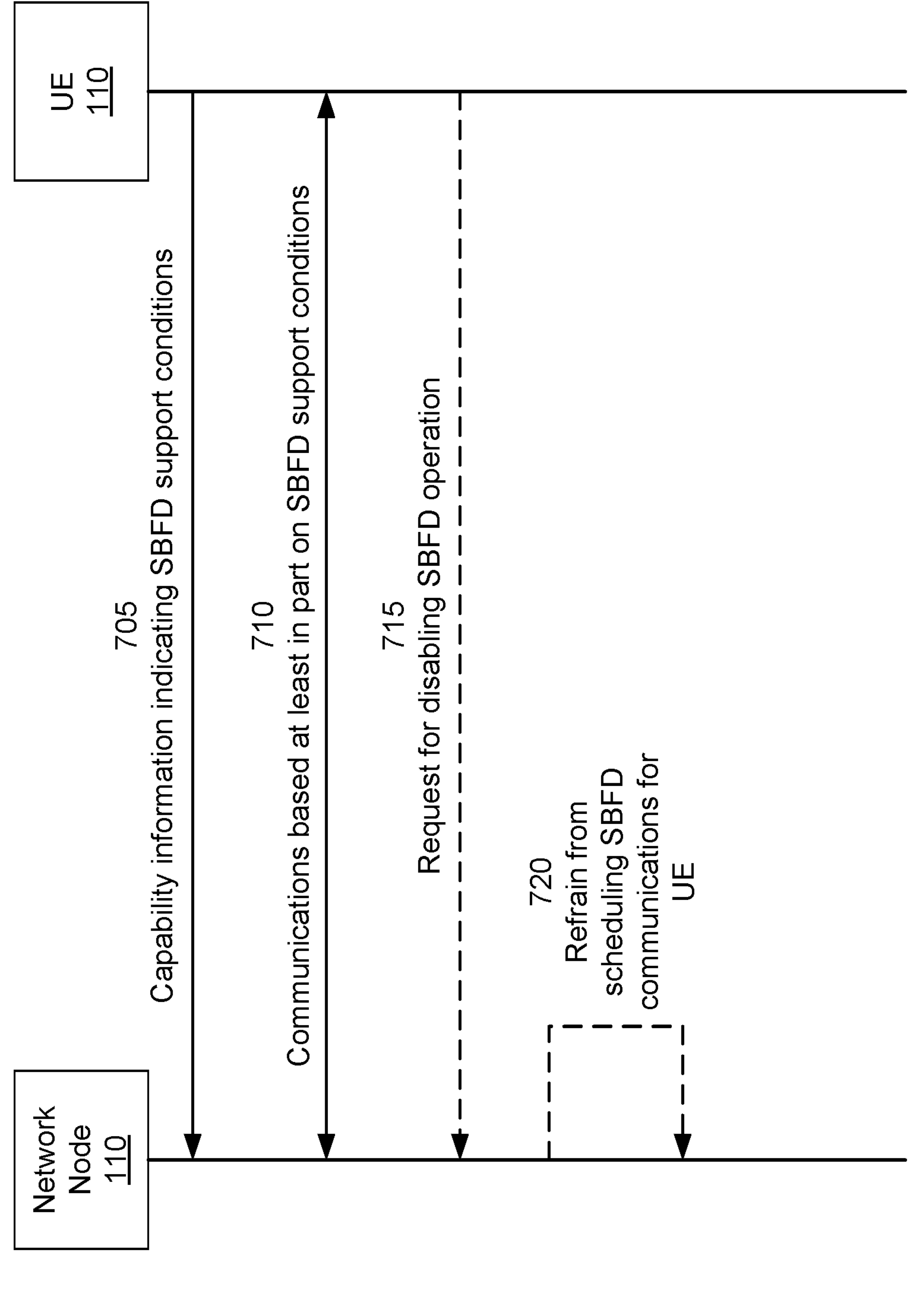

FIGS. 7A-7D are diagrams illustrating an example 700 associated with UE SBFD communications, in accordance with the present disclosure. As shown in FIG. 7A, example 700 includes communication between a network node 110 (e.g., a CU, a DU, and/or an RU) and a UE 120. In some aspects, the network node 110 and the UE 120 may be included in a wireless network, such as wireless network 100. The network node 110 and the UE 120 may communicate via a wireless access link, which may include an uplink and a downlink. The UE 120 and the network node 110 may have established a wireless connection prior to operations shown in FIG. 7A.

As shown in FIG. 7A, and by reference number 705, the UE 120 may transmit, to the network node 110, capability information indicating one or more SBFD support conditions for the UE 120. The SBFD support conditions may indicate one or more conditions, rules, or restrictions for SBFD operation by the UE 120. For example, SBFD operation at the UE 120 may be conditional on the one or more SBFD support conditions (e.g., one or more conditions, rules, restrictions) being satisfied. In some aspects, the capability information indicating the SBFD support conditions may be reported to the network node 110 as part of UE capability reporting for the UE 120. For example, the capability information may be included in UE capability information transmitted via an RRC message in response to a UE capability enquiry from the network node. Alternatively, the capability information may be included in UE assistance information or a MAC-CE on a physical uplink shared channel (PUSCH).

In some aspects, the SBFD support conditions may include an SBFD support condition that indicates support for SBFD operation by the UE 120 based at least in part on different antenna panels of the UE 120 being used for downlink reception and uplink transmission. For example, the SBFD support condition may indicate that the UE 120 supports SBFD operation only when different antenna panels are used for downlink reception and uplink transmission in an SBFD slot. In some examples, the physical separation of different antenna panels used for downlink reception and uplink transmission may suppress interference on the downlink reception from the uplink transmission.

In some aspects, the SBFD support conditions may include an SBFD support condition that indicates support for SBFD operation by the UE 120 based at least in part on a separation between an Rx subcarrier for downlink reception and a Tx subcarrier for uplink transmission satisfying a threshold. For example, the SBFD support condition may indicate the threshold that defines a minimum frequency separation (Δf) between the Rx subcarrier (e.g., the subcarrier allocated for a scheduled downlink communication to be received by the UE 120 in an SBFD slot) and the Tx subcarrier (e.g., the subcarrier allocated for a scheduled uplink communication to be transmitted by the UE 120 in the SBFD slot). In this case, SBFD operation may be supported by the UE 120 only when the separation (Δf) between the Rx subcarrier and the Tx subcarrier satisfies (e.g., is greater than or equal to) the threshold. In some aspects, the same threshold may apply for SBFD communications (e.g., downlink reception and uplink transmission) using the same antenna panel of the UE 120 or for SBFD communications using different antenna panels of the UE 120. In some other aspects, the SBFD support condition(s) may indicate different thresholds for SBFD communications using the same antenna panel and for SBFD communications using different antenna panels. For example, SBFD support condition(s) may indicate that the UE 120 supports SBFD operation with the same antenna panel being used for downlink reception and uplink transmission in connection with a first threshold (thresholdsamePanel) being satisfied, and the UE 120 supports SBFD operation with different antenna panels being used for downlink reception and uplink transmission in connection with a second threshold (thresholdDifferentPanel) being satisfied. The absence of the second threshold in the capability information may indicate no frequency separation requirement while using different antenna panels for downlink reception and uplink transmission.

Figure 7B:
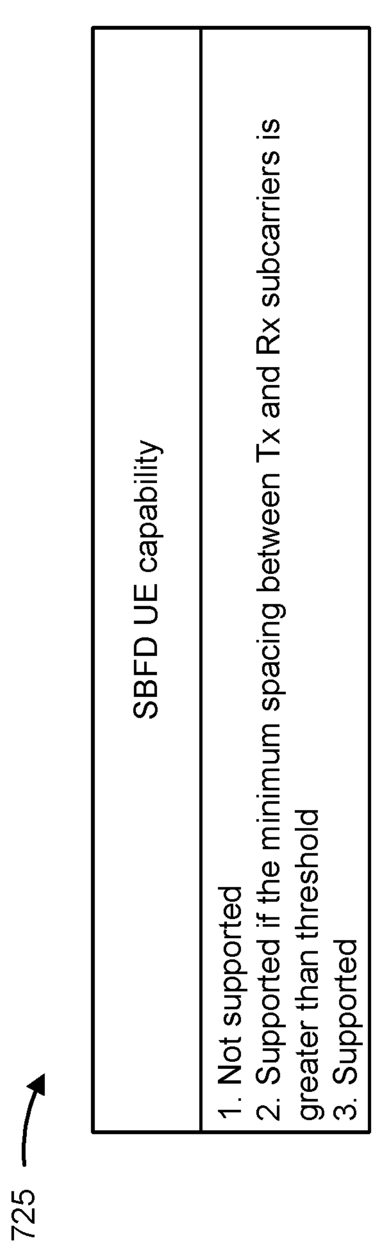
Figure 7B:
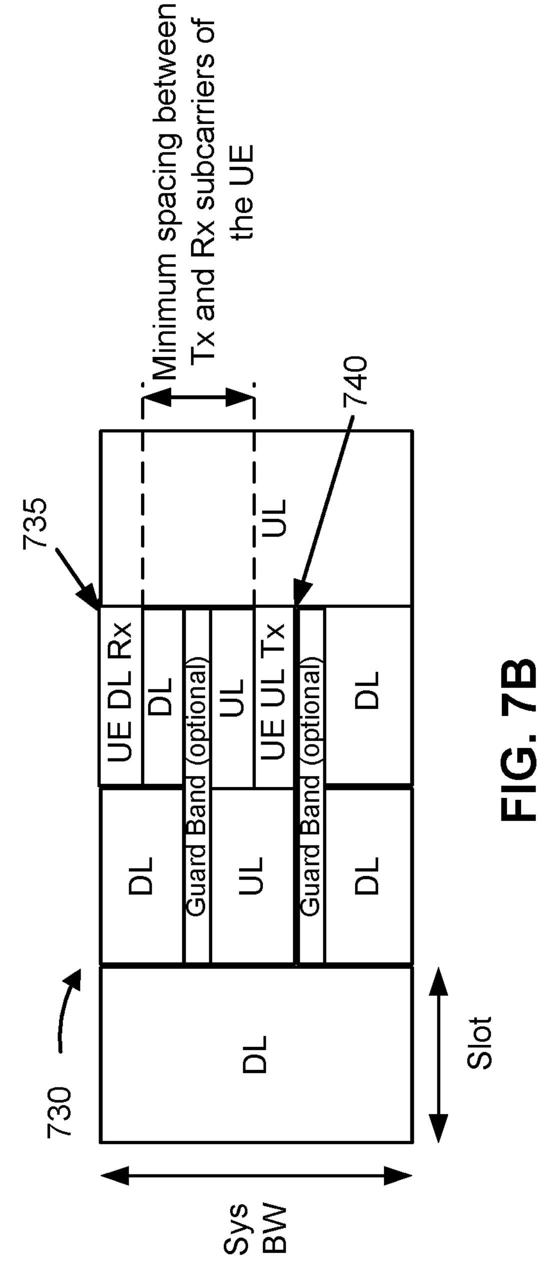

In some aspects, the capability information may indicate that the UE does not support SBFD operation, the UE supports SBFD operation, or the UE supports SBFD operation conditional on one more SBFD support conditions. For example, as shown in FIG. 7B and by reference number 725, the capability information may indicate that SBFD operation is not supported by the UE, SBFD operation is supported by the UE conditional on the minimum spacing between the Tx and Rx subcarriers satisfying (e.g., being greater than) a first threshold, or supported by the UE (e.g., supported without a minimum spacing condition). As shown by reference number 730, in some aspects, the SBFD slot format may include two downlink BWPs and an uplink BWP, separated by guard bands. In some other aspects, the SBFD slot format may be configured without the guard bands between the downlink and uplink BWPs (e.g., the SBFD slot format may be configured with zero guard bands). One or more Rx subcarriers (shown by reference number 735) may be allocated for a downlink communication scheduled to be received by the UE 120 in a SBFD slot, and one or more Tx subcarriers (shown by reference number 740) may be allocated for an uplink communication scheduled to be transmitted by the UE 120 in the SBFD slot. As shown in FIG. 7B, the minimum spacing between the Tx and Rx subcarriers is the minimum frequency separation (Δf) between the one or more Tx subcarriers allocated for the uplink transmission by the UE 120 in the SBFD slot and the one or more Rx subcarriers allocated for the downlink reception by the UE 120 in the SBFD slot.

As shown in FIG. 7C, and by reference number 745, in some aspects, the SBFD support conditions may include different SBFD support conditions for SBFD operation using the same antenna panels (shown by reference number 750) or different antenna panels (shown by reference number 755) for downlink reception and uplink transmission.

That is, the SBFD support conditions may include a first SBFD support condition that indicates a first UE capability for SBFD operation using the same antenna panel of the UE 120 for downlink reception and uplink transmission and a second SBFD support condition that indicates a second UE capability for SBFD operation using different antenna panels for downlink reception and uplink transmission. For example, as shown in FIG. 7B, the first SBFD support condition may indicate that SBFD operation with the same antenna panel for downlink reception and uplink transmission is not supported, supported conditional on the minimum spacing between the Tx and Rx subcarriers satisfying (e.g., being greater than) a first threshold (thresholdsamcPanel), or supported (e.g., supported without a minimum spacing condition). The second SBFD support condition may indicate that SBFD operation with different antenna panels for downlink reception and uplink transmission is not supported, supported conditional on the minimum spacing between the Tx and Rx subcarriers satisfying (e.g., being greater than) a second threshold (thresholdDifferentPanel), or supported (e.g., supported without a minimum spacing condition).

In some aspects, the SBFD support conditions may indicate support for SBFD operation by the UE 120 based at least in part on at least one of a type or a priority of an uplink transmission scheduled for the UE 120 in an SBFD slot. In this case, the UE 120 may support SBFD operation only for a certain type (e.g., physical uplink control channel (PUCCH) or PUSCH) and/or a certain priority of uplink transmissions. For example, the UE 120 may only support SBFD communications, in which the uplink transmission is an aggressor (e.g., causes interference) to the downlink reception, when the uplink transmission (e.g., PUCCH or PUSCH transmission) is associated with a high priority.

As shown in FIG. 7D, and by reference number 760, in some aspects, the SBFD support conditions may indicate SBFD support conditions for different uplink channel types (e.g., PUCCH and PUSCH) and different priorities (e.g., high priority and regular priority) for uplink transmissions. For example, the SBFD support conditions may include a first SBFD support condition that indicates a first UE capability for SBFD operation for a PUCCH communication associated with a first priority (e.g., a high priority), a second SBFD support condition that indicates a second UE capability for SBFD operation for a PUCCH communication associated with a second priority (e.g., a regular priority), a third SBFD support condition that indicates a third UE capability for SBFD operation for a PUSCH communication associated with the first priority (e.g., the high priority), and a fourth SBFD support condition that indicates a fourth UE capability for SBFD operation for a PUSCH communication associated with the second priority (e.g., the regular priority). As shown in FIG. 7C, the first SBFD support condition may indicate whether SBFD operation is supported or not supported for a PUCCH communication associated with the first priority (e.g., the high priority). The second SBFD support condition may indicate whether SBFD operation is supported or not supported for a PUCCH communication associated with the second priority (e.g., the regular priority). The third SBFD support condition may indicate whether SBFD operation is supported or not supported for a PUSCH communication associated with the first priority (e.g., the high priority). The fourth SBFD support condition May indicate whether SBFD operation is supported or not supported for a PUSCH communication associated with the second priority (e.g., the regular priority). Additionally, or alternatively, the respective SBFD support condition for each uplink channel type (e.g., PUCCH and PUSCH) and priority may indicate whether SBFD operation for that channel type and priority is supported conditional on the minimum spacing between the Tx and Rx subcarriers satisfying a threshold. Furthermore, in some aspects, the SBFD support conditions may indicate, for each uplink channel type and priority, UE capabilities for SBFD operation with the same antenna panel for downlink reception and uplink transmission or and for SBFD operation with different antenna panels for downlink reception and uplink transmission.

In some aspects, the SBFD support conditions may indicate SBFD support conditions for different uplink grant types (e.g., dynamic grant and configured grant). For example, the SBFD support conditions may include one or more of a first SBFD support condition that indicates a first UE capability for SBFD operation associated with dynamic grant uplink communications and/or a second SBFD support condition that indicates a second UE capability associated with configured grant uplink communications. The SBFD support conditions may additionally indicate different priorities and/or other conditions (e.g., frequency separation or different antenna panels, among other examples) associated with the different uplink grant types. For example, the SBFD support conditions may indicate that the UE supports SBFD operation for configured grants, the UE does not support SBFD operation for configured grants, or the UE supports SBFD operation for configured grants only if one or more other conditions (e.g., a priority of the uplink communication, a minimum frequency separation between Tx and Rx subcarriers, or different antenna panels for downlink reception and uplink transmission, among other examples) are satisfied.

In some aspects, the priority of an uplink transmission scheduled for the UE 120 may be included in DCI (e.g., a downlink or uplink grant) that schedules (e.g., allocates resources for) the uplink transmission. For example, the network node 110 may transmit, and the UE 120 may receive, the DCI (e.g., the downlink or uplink grant) that schedules the uplink transmission (e.g., in an SBFD slot), and the DCI may include a priority indicator that indicates the priority of the uplink transmission. In one example, the priority for a PUCCH transmission (e.g., a hybrid automatic repeat request (HARQ) acknowledgement (HARQ-ACK) PUCCH transmission) scheduled by a downlink grant may be indicated by a priority indicator field in DCI format 1_1 or DCI format 1_2. In another example, the priority for a PUCCH transmission (e.g., an aperiodic channel state information (CSI) PUCCH transmission) scheduled by an uplink grant may be indicated by a priority indicator field in DCI format 0_1 or DCI format 0_2. In another example, the priority for a PUSCH transmission scheduled by an uplink grant may be indicated by the priority indicator field in DCI format 0_1 or DCI format 0_2.

In some aspects, the SBFD support conditions may include respective SBFD support conditions associated with one or more uplink and/or downlink transmission parameters. For example, the SBFD support conditions may indicate restrictions on uplink and/or downlink transmission parameters for SBFD operation, which may result in uplink and/or downlink transmission parameters for SBFD uplink and downlink transmissions that are different from uplink and/or downlink parameters for non-SBFD uplink and downlink transmissions. In some aspects, the SBFD support conditions may indicate a maximum modulation order for downlink transmission, uplink transmission, or both downlink and uplink transmission and/or a minimum coding rate for downlink transmission, uplink transmission, or both downlink and uplink transmission. Additionally, or alternatively, in some aspects, the SBFD support conditions may indicate a maximum number of carriers for which SBFD operation is supported by the UE 120 at a time. For example, the SBFD support conditions may indicate that SBFD can be enabled for the UE 120 on up to x carriers at a time (e.g., x=12, among other examples) or y resource blocks (e.g., y=1, among other examples).

In some aspects, the SBFD support conditions may indicate that a maximum transmit power for an uplink band or sub-band is based at least in part on the separation between the allocated Tx and Rx subcarriers for the SBFD communications (and/or based at least in part on whether the same antenna panel or different antenna panels are used for SBFD communications). For example, a higher transmit power may be supported by the UE 120 for a larger separation between the Tx and Rx subcarriers than for a smaller separation between the Tx and Rx subcarriers. In some aspects, the maximum transmit power to be used for uplink transmission during SBFD operation by the UE 120 may be based at least in part on a maximum transit power reduction determined as a function of the separation between Tx and Rx subcarriers ($f(\Delta f)$). In some aspects, the function ($f(\Delta f)$) may be a UE-specific function, and the UE-specific function may be reported by the UE 120 as part of the capability information transmitted by the UE 120 (e.g., indicated in the SBFD support conditions). In this case, the UE 120 may select the function ($f(\Delta f)$) to be used for determining the maximum transmit power reduction from a defined set of functions, and include an indication of the selected function in the capability information (e.g., in the SBFD support conditions) transmitted by the UE 120 to the network node 110. For example, the set of functions may be defined in accordance with a wireless communication standard (e.g., a 3GPP standard), and the UE 120 may select the function from the defined set of functions based at least in part on the UE capability. Each function, in the set of functions, may be associated with a respective index, and the UE 120 may indicate the index of the selected function ($f(\Delta f)$) in the capability information. In some examples, the function ($f(\Delta f)$) may be a constant (e.g., $f(\Delta f)=c$, where c is a constant). In this case, the UE 120 may reduce the maximum transmission power for uplink transmission by c dB when SBFD is used, regardless of the separation between the Rx and Tx subcarriers ($\Delta f$).

In some other aspects, the function ($f(\Delta f)$) for determining the maximum transmit power reduction for uplink transmission during SBFD operation may be a non-UE-specific function. For example, the function ($f(\Delta f)$) may be a system-wide function used for maximum transmit power reduction/backoff for all UEs connected to the network node 110 (and/or all UEs in the wireless network) that required maximum transmit power reduction/backoff for SBFD operation. In this case, the UE 120 may indicate, in the capability information (e.g., in the SBFD support conditions), whether or not the UE 120 requires the maximum transmit power reduction/backoff for SBFD operation. For example, the UE 120 may indicate, in the capability information (e.g., in the SBFD support conditions) a UE capability for SBFD operation with or without the maximum transmit power reduction.

In some aspects, the maximum transmit power reduction for uplink transmission during SBFD operation may be determined based at least in part on the whether the same antenna panel or different antenna panels of the UE 120 are being used for downlink reception and uplink transmission. For example, a higher transmit power may be supported by the UE 120 for the case in which different antenna panels are used than for the case in which the same antenna panel is used. In some aspects, the maximum transmit power reduction may be determined based at least in part on separation between the Rx and Tx subcarriers and based at least in part on the same antenna panel or different antenna panels of the UE 120 being used for SBFD communications. For example, a first function ($f_1(\Delta f)$) may be used (e.g., and indicated in the capability information) for the case in which the same antenna panel is used for SBFD communications, and a second function ($f_2(\Delta f)$) may be used (e.g., and indicated in the capability information) for the case in which different antenna panels are used for SBFD communications.

Returning to FIG. 7A, as shown by reference number 710, the network node 110 and the UE 120 may communicate based at least in part on the one or more SBFD support conditions for the UE 120. In some aspects, the network node 110 and the UE 120 may communicate via SBFD communications in a slot (e.g., an SBFD slot) in accordance with the SBFD support conditions for the UE 120 being satisfied. For example, the network node 110 may transmit a downlink communication to the UE 120 in an SBFD slot, and the network node 110 may receive an uplink communication from the UE 120 in the SBFD slot, in accordance with the SBFD support conditions being satisfied. The UE 120 may receive the downlink communication in the SBFD slot, and the UE 120 may transmit the uplink communication in the SBFD slot in accordance with the SBFD support conditions being satisfied. The SBFD slot may be a slot configured with an SBFD slot format, as described above in connection with FIG. 6.

In some aspects, SBFD communications (e.g., the downlink and uplink communications) in the SBFD slot may be scheduled via DCI (e.g., via downlink and/or uplink grants). The network node 110 may transmit, and the UE 120 may receive, the DCI (e.g., downlink and/or uplink grants) that schedules the downlink communication to be received by the UE 120 in the SBFD slot and the uplink communication to be transmitted by the UE 120 in the SBFD slot. In some aspects, the network node 110 may schedule the SBFD communications for the UE 120 (e.g., the downlink and uplink communications in the SBFD slot) based at least in part on a determination that the SBFD support conditions for the UE 120 are satisfied for the scheduled SBFD communications. In some aspects, the network node 110 may refrain from scheduling SBFD communications (e.g., downlink and uplink communications) in an SBFD slot based at least in part on a determination that one or more SBFD support conditions for the UE 120 are not satisfied. That is, the network node 110 may disable SBFD operation for the UE 120 in a slot configured as an SBFD slot via scheduling (e.g., by refraining from scheduling SBFD communications for the UE 120) in connection with one or more SBFD support conditions for the UE 120 not being satisfied.

In some aspects, the determination of whether the SBFD support conditions are satisfied may be based at least in part on whether the UE 120 is to receive the downlink communication and transmit the uplink communication using the same antenna panel or different antenna panels. In this case, the network node 110 may determine whether the UE 120 will use the same antenna panel or different antenna panels for receiving the downlink communication and transmitting the uplink communication based at least in part on a mapping between antenna ports and antenna panels of the UE 120.

In some aspects, the determination of whether the SBFD support conditions for the UE 120 are satisfied may be based at least in part on the separation between the Rx subcarrier(s) allocated for the downlink communication in the SBFD slot and the Tx subcarrier(s) allocated for the uplink communication in the SBFD slot satisfying a threshold (e.g., thresholdsamePanel or thresholdDifferentPanel). In this case, the network node 110 may only schedule SBFD communications for the UE 120 in the SBFD slot using Rx and Tx subcarriers separated with a minimum spacing that satisfies the threshold.

In some aspects, the determination of whether the SBFD support conditions for the UE 120 are satisfied may be based at least in part on the type (e.g., PUCCH or PUSCH) and/or the priority of the uplink communication scheduled in the SBFD slot. For example, the DCI (e.g., downlink or uplink grant) that schedules the uplink communication in the SBFD slot may include a priority indicator that indicates the priority of the uplink communication, and the network node 110 may only schedule SBFD communications in the SBFD slot with a type and priority of uplink communication for which SBFD operation is supported by the UE 120. In this case, the network node 110 and the UE 120 communicating via SBFD communications in the SBFD slot may be based at least in part on the type and/or the priority of the scheduled uplink communication in the SBFD slot.

In some aspects, the network node 110 may select downlink and/or uplink transmission parameters for the SBFD communications that satisfy SBFD support conditions associated with downlink and/or uplink transmission parameters. In the case in which one or more SBFD support conditions are associated with downlink transmission parameters, the network node 110 may transmit the downlink communication in the SBFD slot using downlink transmission parameters that satisfy the SBFD support conditions associated with the downlink transmission parameters. In the case in which one or more SBFD support conditions are associated with uplink transmission parameters, the network node 110 may indicate, to the UE 120 (e.g., in the DCI scheduling the uplink communication in the SBFD slot), uplink transmission parameters that satisfy the SBFD support conditions associated with the uplink transmission parameters. In this case, the UE 120 may transmit the uplink communication in the SBFD slot using the uplink transmission parameters that satisfy the SBFD support conditions associated with the uplink transmission parameters.

The UE 120 may receive the scheduled downlink communication in an Rx subcarrier of a downlink sub-band configured for the SBFD slot, and the UE 120 may transmit the scheduled uplink communication in a Tx subcarrier of an uplink sub-band configured for the SBFD slot. In some aspects, the maximum transmit power for transmitting the uplink communication by the UE 120 may be based at least in part on the separation between the Rx subcarrier and the Tx subcarrier. For example, the UE 120 may determine a maximum transmit power reduction as a function of the separation between the Rx subcarrier and the Tx subcarrier ($f(\Delta f)$). As described above, the function ($f(\Delta f)$) may be a UE-specific function (e.g., indicated in the capability information) or a non-UE-specific function (e.g., a system-wide function). Additionally, or alternatively, the maximum transmit power reduction may be determined based at least in part on the same antenna panel or different antenna panels of the UE 120 being used to receive the scheduled communication in the SBFD slot and transmit the scheduled uplink communication in the SBFD slot. For example, the UE 120 may determine the maximum transmit power reduction using a first function ($f_1(\Delta f)$) when the same antenna panel is used for the SBFD communications or a second function ($f_2(\Delta f)$) when different antenna panels are used for the SBFD communications.

In some aspects, if the network node 110 schedules SBFD communications for the UE 120 in an SBFD slot (e.g., a scheduled downlink communication and a scheduled uplink communication in the SBFD slot) and one or more of the SBFD support conditions for the UE 120 are not satisfied, the UE 120 may refrain receiving the scheduled downlink communication or refrain from transmitting the scheduled uplink communication based at least in part on the one or more of the SBFD support conditions for the UE 120 not being satisfied. In some aspects, the UE 120 may apply a default rule (or a rule configured by the network node 110) for an error case in which SBFD communications are scheduled for the UE 120 and one or more SBFD support conditions for the UE 120 are not satisfied. In one example, the UE 120 may transmit the scheduled uplink communication in the SBFD slot and discard the scheduled downlink communication in the SBFD slot (e.g., refrain from performing the scheduled downlink reception) when one or more SBFD support conditions for the UE 120 are not satisfied. In another example, the UE 120 may receive the scheduled downlink communication in the SBFD slot and discard the scheduled uplink communication in the SBFD slot (e.g., refrain from performing the scheduled uplink transmission) when one or more SBFD support conditions for the UE 120 are not satisfied. In another example, when one or more SBFD support conditions for the UE 120 are not satisfied, the UE 120 may select whether to receive the scheduled downlink communication (and refrain from transmitting the scheduled uplink communication) in the SBFD slot or transmit the scheduled uplink transmission (and refrain from receiving the scheduled downlink communication) in the SBFD slot, for example based at least in part on priorities of the scheduled downlink and uplink communications.

As further shown by FIG. 7A, and by reference number 715, in some aspects, the UE 120 may transmit, and the network node 110 may receive, a request for disabling SBFD operation for the UE 120. For example, the request may be a request for the network node 110 to refrain from scheduling SBFD communications for the UE 120. In some aspects, the UE 120 may request that the network node 110 refrain from scheduling SBFD communications for the UE 120 for a time period (e.g., a time period indicated in the request). In some other aspects, the UE 120 may request that the network node 110 refrain from scheduling SBFD communications for the UE 120 indefinitely (e.g., until the UE 120 transmits another request to enable SBFD operation for the UE 120). In some aspects, the request may be indicated via UE assistance information or a UE capability information update, among other examples. For example, the request may be transmitted via an RRC message, a MAC-CE, or uplink control information (UCI). In some aspects, the UE 120 may transmit the request to disable SBFD operation for the UE 120 to avoid overhead associated with SBFD operation. For example, the UE 120 may transmit the request to disable SBFD operation for the UE 120 based at least in part on a thermal energy of the UE 120, a battery level of the UE 120, and/or an amount of available processing power of the UE 120, among other examples.

As further shown in FIG. 7A, and by reference number 720, in some aspects, the network node 110 may refrain from scheduling SBFD communications for the UE 120. For example, the UE 120 may refrain from scheduling SBFD communications for the UE 120 based at least in part on receiving the request for disabling SBFD operation (e.g., the request to refrain from scheduling SBFD communications) from the UE 120. In some aspects, the network node 110, based at least in part on receiving the request from the UE 120, may refrain from scheduling SBFD communications for the UE 120 for a time period (e.g., a time period indicated in the request). In some other aspects, the network node 110, based at least in part on receiving the request from the UE 120, may refrain from scheduling SBFD communications for the UE 120 until the network node 110 receives a request for enabling SBFD communications for the UE 120.

As indicated above, FIGS. 7A-7D are provided as an example. Other examples may differ from what is described with respect to FIGS. 7A-7D.

Figure 8:
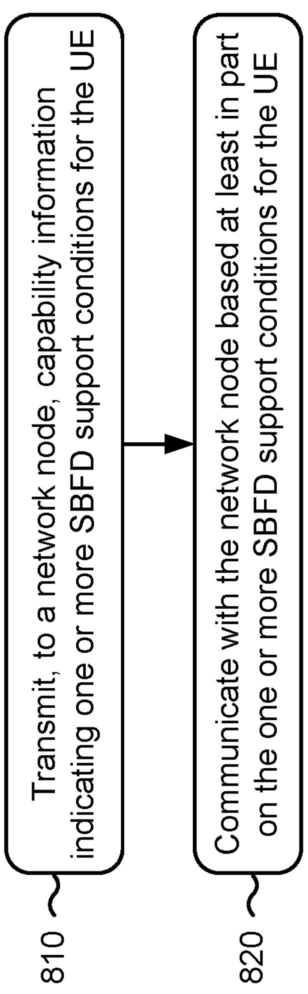
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with UE SBFD communications.

As shown in FIG. 8, in some aspects, process 800 may include transmitting, to a network node, capability information indicating one or more SBFD support conditions for the UE (block 810). For example, the UE (e.g., using transmission component 1004 and/or communication manager 1006, depicted in FIG. 10) may transmit, to a network node, capability information indicating one or more SBFD support conditions for the UE, as described above.

As further shown in FIG. 8, in some aspects, process 800 may include communicating with the network node based at least in part on the one or more SBFD support conditions for the UE (block 820). For example, the UE (e.g., using reception component 1002, transmission component 1004, and/or communication manager 1006, depicted in FIG. 10) may communicate with the network node based at least in part on the one or more SBFD support conditions for the UE, as described above.

Process 800 may include additional aspects, such as any single aspect or any combination of aspects described below and/or in connection with one or more other processes described elsewhere herein.

In a first aspect, communicating with the network node based at least in part on the one or more SBFD support conditions includes communicating with the network node via SBFD communications in a slot in accordance with the one or more SBFD support conditions for the UE being satisfied.

In a second aspect, alone or in combination with the first aspect, the one or more SBFD support conditions indicate support for SBFD operation by the UE based at least in part on different antenna panels of the UE being used for downlink reception and uplink transmission.

In a third aspect, alone or in combination with one or more of the first and second aspects, the one or more SBFD support conditions indicate support for SBFD operation by the UE based at least in part on a separation between a receive subcarrier for downlink reception and a transmit subcarrier for uplink transmission satisfying a threshold.

In a fourth aspect, alone or in combination with one or more of the first through third aspects, the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE or a second threshold for downlink reception and uplink transmission using different antenna panels of the UE.

In a fifth aspect, alone or in combination with one or more of the first through fourth aspects, the one or more SBFD support conditions include a first SBFD support condition that indicates a first UE capability for SBFD operation using a same antenna panel of the UE for downlink reception and uplink transmission, and a second SBFD support condition that indicates a second UE capability for SBFD operation using different antenna panels of the UE for downlink reception and uplink transmission.

In a sixth aspect, alone or in combination with one or more of the first through fifth aspects, the first SBFD support condition indicates that SBFD operation using the same antenna panel of the UE for downlink reception and uplink transmission is not supported, supported, or supported in connection with a separation between a receive subcarrier for downlink reception and a transmit subcarrier for uplink transmission satisfying a first threshold, and the second SBFD support condition indicates that SBFD operation using different antenna panels of the UE for downlink reception and uplink transmission is not supported, supported, or supported in connection with the separation between the receive subcarrier for downlink reception and the transmit subcarrier for uplink transmission satisfying a second threshold.

In a seventh aspect, alone or in combination with one or more of the first through sixth aspects, the one or more SBFD support conditions indicate support for SBFD operation by the UE based at least in part on at least one of a type or a priority of an uplink transmission scheduled for the UE.

In an eighth aspect, alone or in combination with one or more of the first through seventh aspects, process 800 includes receiving DCI that schedules the uplink transmission, wherein the DCI includes a priority indicator that indicates the priority of the uplink transmission, and wherein communicating with the network node based at least in part on the one or more SBFD support conditions includes communicating with the network node via SBFD communications in a slot in which the uplink transmission is scheduled based at least in part on the at least one of the type or the priority of the uplink transmission.

In a ninth aspect, alone or in combination with one or more of the first through eighth aspects, the one or more SBFD support conditions include at least one of a first SBFD support condition that indicates whether the UE supports SBFD operation for a PUCCH communication associated with a first priority, a second SBFD support condition that indicates whether the UE supports SBFD operation for a PUCCH communication associated with a second priority, a third SBFD support condition that indicates whether the UE supports SBFD operation for a PUSCH communication associated with the first priority, or a fourth SBFD support condition that indicates whether the UE supports SBFD operation for a PUSCH communication associated with the second priority.

In a tenth aspect, alone or in combination with one or more of the first through ninth aspects, the one or more SBFD support conditions include respective SBFD support conditions associated with one or more uplink or downlink transmission parameters.

In an eleventh aspect, alone or in combination with one or more of the first through tenth aspects, the respective SBFD support conditions associated with the one or more uplink or downlink transmission parameters indicate at least one of a maximum modulation order, for downlink transmission, uplink transmission, or downlink and uplink transmission, for which SBFD operation is supported by the UE, or a minimum coding rate, for downlink transmission, uplink transmission, or downlink and uplink transmission, for which SBFD operation is supported by the UE.

In a twelfth aspect, alone or in combination with one or more of the first through eleventh aspects, the respective SBFD support conditions associated with the one or more uplink or downlink transmission parameters indicate a maximum number of carriers on which SBFD operation is supported by the UE at a time.

In a thirteenth aspect, alone or in combination with one or more of the first through twelfth aspects, communicating with the network node includes receiving, in a slot, a downlink communication in a receive subcarrier of a downlink sub-band, and transmitting, in the slot, an uplink communication in a transmit subcarrier of an uplink sub-band with a maximum transmit power that is based at least in part on a separation between the receive subcarrier and the transmit subcarrier.

In a fourteenth aspect, alone or in combination with one or more of the first through thirteenth aspects, the maximum transmit power is based at least in part on a maximum transmit power reduction determined as a function of the separation between the receive subcarrier and the transmit subcarrier.

In a fifteenth aspect, alone or in combination with one or more of the first through fourteenth aspects, the function is a UE-specific function, and the capability information includes an indication of the UE-specific function.

In a sixteenth aspect, alone or in combination with one or more of the first through fifteenth aspects, the function is a non-UE-specific function, and the capability information includes an indication of UE capability for SBFD operation with or without the maximum transmit power reduction.

In a seventeenth aspect, alone or in combination with one or more of the first through sixteenth aspects, the maximum transmit power is based at least in part on a maximum transmit power reduction determined based at least in part on different antenna panels of the UE being used for downlink reception and uplink transmission.

In an eighteenth aspect, alone or in combination with one or more of the first through seventeenth aspects, process 800 includes transmitting, to the network node, a request to refrain from scheduling SBFD communications for the UE.

In a nineteenth aspect, alone or in combination with one or more of the first through eighteenth aspects, process 800 includes refraining from performing a scheduled downlink reception or a scheduled uplink transmission in a slot based at least in part on the one or more SBFD support conditions for the UE not being satisfied.

In a twentieth aspect, alone or in combination with one or more of the first through nineteenth aspects, the one or more SBFD support conditions indicate support for SBFD operation by the UE based at least in part on an uplink grant type associated with an uplink transmission scheduled for the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
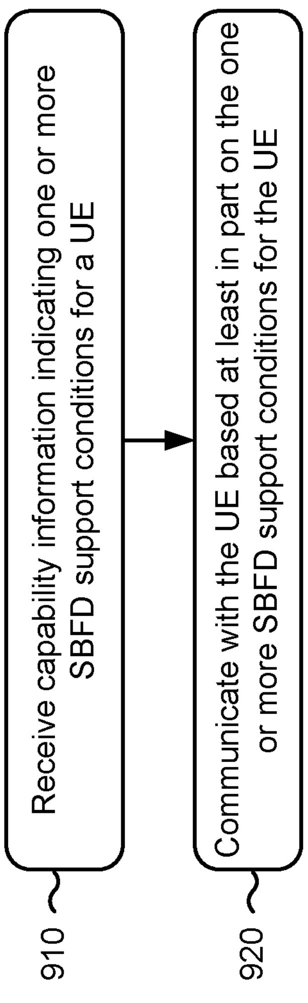
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with UE SBFD communications.

As shown in FIG. 9, in some aspects, process 900 may include receiving capability information indicating one or more SBFD support conditions for a UE (block 910). For example, the network node (e.g., using reception component 1102 and/or communication manager 1106, depicted in FIG. 11) may receive capability information indicating one or more SBFD support conditions for a UE, as described above.

As further shown in FIG. 9, in some aspects, process 900 may include communicating with the UE based at least in part on the one or more SBFD support conditions for the UE (block 920). For example, the network node (e.g., using reception component 1102, transmission component 1104, and/or communication manager 1106, depicted in FIG. 11) may communicate with the UE based at least in part on the one or more SBFD support conditions for the UE, as described above.

Process 900 may include additional aspects, such as any single aspect or any combination of aspects described below and/or in connection with one or more other processes described elsewhere herein.

In a first aspect, communicating with the UE based at least in part on the one or more SBFD support conditions includes communicating with the UE via SBFD communications in a slot in accordance with the one or more SBFD support conditions for the UE being satisfied.

In a second aspect, alone or in combination with the first aspect, the one or more SBFD support conditions indicate support for SBFD operation by the UE based at least in part on different antenna panels of the UE being used for downlink reception and uplink transmission.

In a third aspect, alone or in combination with one or more of the first and second aspects, the one or more SBFD support conditions indicate support for SBFD operation by the UE based at least in part on a separation between a receive subcarrier for downlink reception and a transmit subcarrier for uplink transmission satisfying a threshold.

In a fourth aspect, alone or in combination with one or more of the first through third aspects, the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE or a second threshold for downlink reception and uplink transmission using different antenna panels of the UE.

In a fifth aspect, alone or in combination with one or more of the first through fourth aspects, the one or more SBFD support conditions include a first SBFD support condition that indicates a first UE capability for SBFD operation using a same antenna panel of the UE for downlink reception and uplink transmission, and a second SBFD support condition that indicates a second UE capability for SBFD operation using different antenna panels of the UE for downlink reception and uplink transmission.

In a sixth aspect, alone or in combination with one or more of the first through fifth aspects, the first SBFD support condition indicates that SBFD operation using the same antenna panel of the UE for downlink reception and uplink transmission is not supported, supported, or supported in connection with a separation between a receive subcarrier for downlink reception and a transmit subcarrier for uplink transmission satisfying a first threshold, and the second SBFD support condition indicates that SBFD operation using different antenna panels of the UE for downlink reception and uplink transmission is not supported, supported, or supported in connection with the separation between the receive subcarrier for downlink reception and the transmit subcarrier for uplink transmission satisfying a second threshold.

In a seventh aspect, alone or in combination with one or more of the first through sixth aspects, the one or more SBFD support conditions indicate support for SBFD operation by the UE based at least in part on at least one of a type or a priority of an uplink transmission scheduled for the UE.

In an eighth aspect, alone or in combination with one or more of the first through seventh aspects, process 900 includes transmitting DCI that schedules the uplink transmission, wherein the DCI includes a priority indicator that indicates the priority of the uplink transmission, and wherein communicating with the UE based at least in part on the one or more SBFD support conditions includes communicating with the UE via SBFD communications in a slot in which the uplink transmission is scheduled based at least in part on the at least one of the type or the priority of the uplink transmission.

In a ninth aspect, alone or in combination with one or more of the first through eighth aspects, the one or more SBFD support conditions include at least one of a first SBFD support condition that indicates whether the UE supports SBFD operation for a PUCCH communication associated with a first priority, a second SBFD support condition that indicates whether the UE supports SBFD operation for a PUCCH communication associated with a second priority, a third SBFD support condition that indicates whether the UE supports SBFD operation for a PUSCH communication associated with the first priority, or a fourth SBFD support condition that indicates whether the UE supports SBFD operation for a PUSCH communication associated with the second priority.

In a tenth aspect, alone or in combination with one or more of the first through ninth aspects, the one or more SBFD support conditions include respective SBFD support conditions associated with one or more uplink or downlink transmission parameters.

In an eleventh aspect, alone or in combination with one or more of the first through tenth aspects, the respective SBFD support conditions associated with the one or more uplink or downlink transmission parameters indicate at least one of a maximum modulation order, for downlink transmission, uplink transmission, or downlink and uplink transmission, for which SBFD operation is supported by the UE, or a minimum coding rate, for downlink transmission, uplink transmission, or downlink and uplink transmission, for which SBFD operation is supported by the UE.

In a twelfth aspect, alone or in combination with one or more of the first through eleventh aspects, the respective SBFD support conditions associated with the one or more uplink or downlink transmission parameters indicate a maximum number of carriers on which SBFD operation is supported by the UE at a time.

In a thirteenth aspect, alone or in combination with one or more of the first through twelfth aspects, communicating with the UE includes transmitting, in a slot, a downlink communication to the UE in a receive subcarrier of a downlink sub-band, and receiving, in the slot, an uplink communication from the UE in a transmit subcarrier of an uplink sub-band, wherein the uplink communication is transmitted with a maximum transmit power that is based at least in part on a separation between the receive subcarrier and the transmit subcarrier.

In a fourteenth aspect, alone or in combination with one or more of the first through thirteenth aspects, the maximum transmit power is based at least in part on a maximum transmit power reduction determined as a function of the separation between the receive subcarrier and the transmit subcarrier.

In a fifteenth aspect, alone or in combination with one or more of the first through fourteenth aspects, the function is a UE-specific function, and the capability information includes an indication of the UE-specific function.

In a sixteenth aspect, alone or in combination with one or more of the first through fifteenth aspects, the function is a non-UE-specific function, and the capability information includes an indication of UE capability for SBFD operation with or without the maximum transmit power reduction.

In a seventeenth aspect, alone or in combination with one or more of the first through sixteenth aspects, the maximum transmit power is based at least in part on a maximum transmit power reduction determined based at least in part on different antenna panels of the UE being used for downlink reception and uplink transmission.

In an eighteenth aspect, alone or in combination with one or more of the first through seventeenth aspects, process 900 includes receiving, from the UE, a request to refrain from scheduling SBFD communications for the UE, and refraining from scheduling SBFD communications for the UE based at least in part on the request.

In a nineteenth aspect, alone or in combination with one or more of the first through eighteenth aspects, the one or more SBFD support conditions indicate support for SBFD operation by the UE based at least in part on an uplink grant type associated with an uplink transmission scheduled for the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
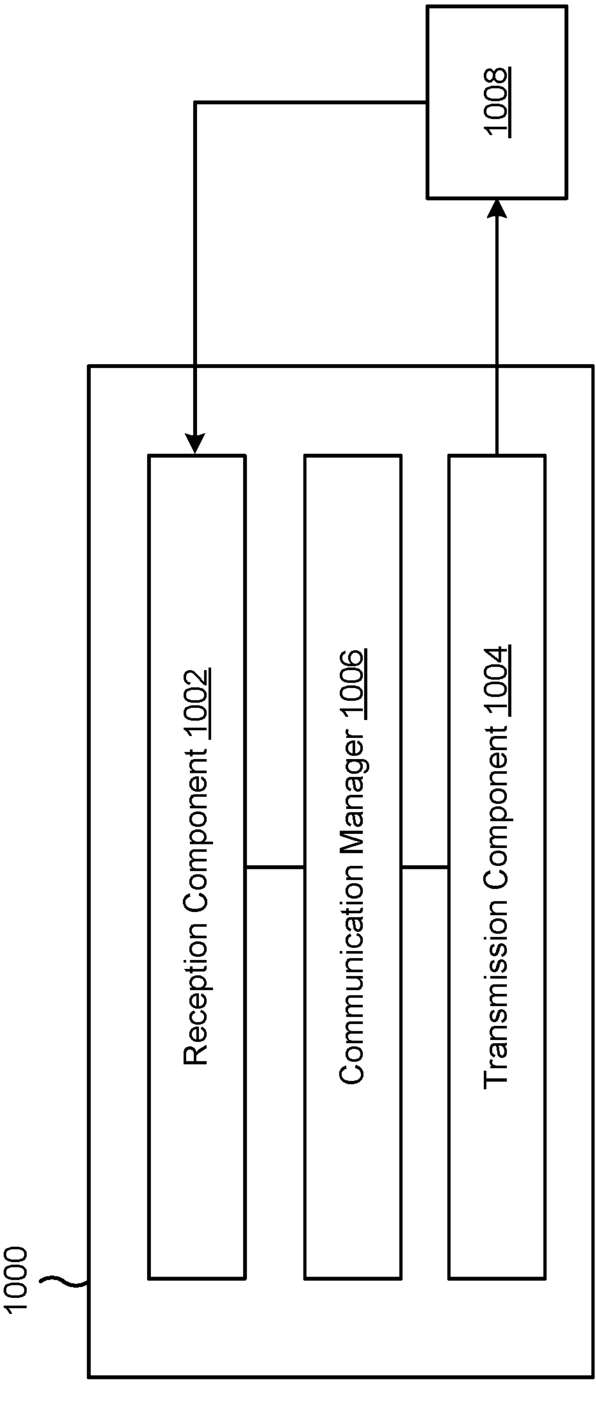
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 7A-7D. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a network node, capability information indicating one or more SBFD support conditions for the UE. The reception component 1002 and/or the transmission component 1004 may communicate with the network node based at least in part on the one or more SBFD support conditions for the UE.

The reception component 1002 may receive DCI that schedules the uplink transmission, wherein the DCI includes a priority indicator that indicates the priority of the uplink transmission, and wherein communicating with the network node based at least in part on the one or more SBFD support conditions comprises communicating with the network node via SBFD communications in a slot in which the uplink transmission is scheduled based at least in part on the at least one of the type or the priority of the uplink transmission.

The transmission component 1004 may transmit, to the network node, a request to refrain from scheduling SBFD communications for the UE.

The communication manager 1006 may refrain from performing a scheduled downlink reception or a scheduled uplink transmission in a slot based at least in part on the one or more SBFD support conditions for the UE not being satisfied.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
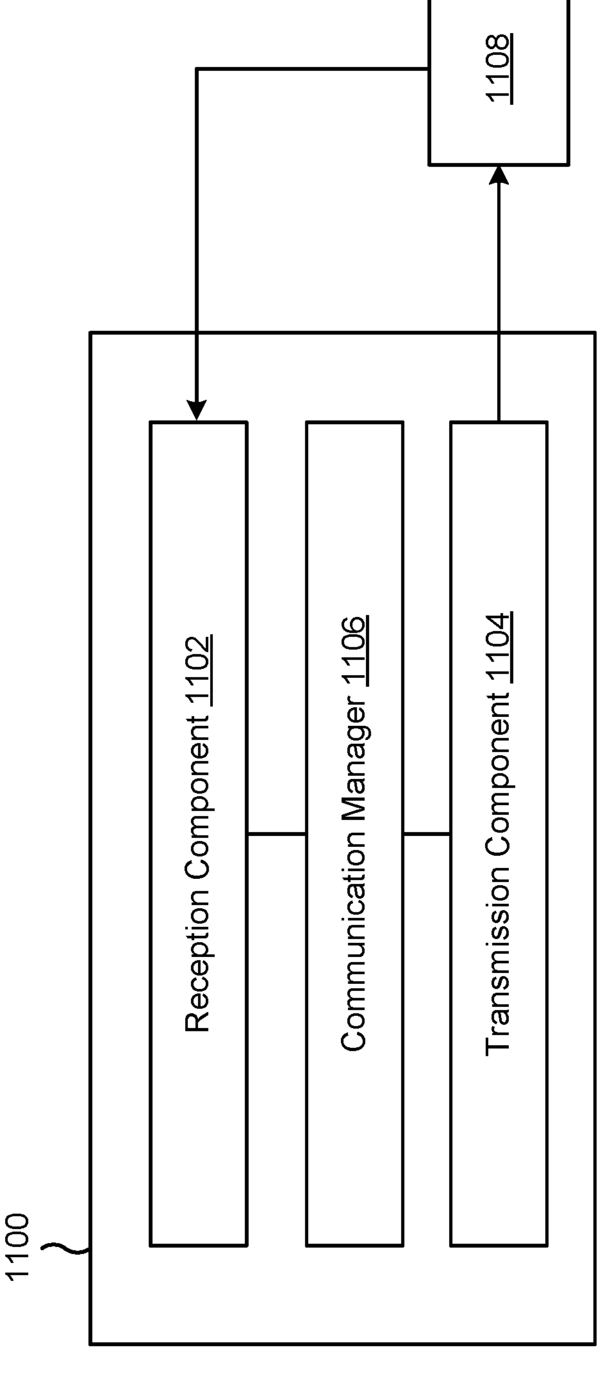

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 7A-7D. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive capability information indicating one or more SBFD support conditions for a UE. The reception component 1102 and/or the transmission component 1104 may communicate with the UE based at least in part on the one or more SBFD support conditions for the UE.

The transmission component 1104 may transmit DCI that schedules the uplink transmission, wherein the DCI includes a priority indicator that indicates the priority of the uplink transmission, and wherein communicating with the UE based at least in part on the one or more SBFD support conditions comprises communicating with the UE via SBFD communications in a slot in which the uplink transmission is scheduled based at least in part on the at least one of the type or the priority of the uplink transmission.

The reception component 1102 may receive, from the UE, a request to refrain from scheduling SBFD communications for the UE.

The communication manager 1106 may refrain from scheduling SBFD communications for the UE based at least in part on the request.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting, to a network node, capability information indicating one or more sub-band full-duplex (SBFD) support conditions for the UE; and communicating with the network node based at least in part on the one or more SBFD support conditions for the UE.

Aspect 2: The method of Aspect 1, wherein communicating with the network node based at least in part on the one or more SBFD support conditions comprises: communicating with the network node via SBFD communications in a slot in accordance with the one or more SBFD support conditions for the UE being satisfied.

Aspect 3: The method of any of Aspects 1-2, wherein the one or more SBFD support conditions indicate support for SBFD operation by the UE based at least in part on different antenna panels of the UE being used for downlink reception and uplink transmission.

Aspect 4: The method of any of Aspects 1-3, wherein the one or more SBFD support conditions indicate support for SBFD operation by the UE based at least in part on a separation between a receive subcarrier for downlink reception and a transmit subcarrier for uplink transmission satisfying a threshold.

Aspect 5: The method of any of Aspects 1-4, wherein the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE or a second threshold for downlink reception and uplink transmission using different antenna panels of the UE.

Aspect 6: The method of any of Aspects 1-5, wherein the one or more SBFD support conditions include: a first SBFD support condition that indicates a first UE capability for SBFD operation using a same antenna panel of the UE for downlink reception and uplink transmission, and a second SBFD support condition that indicates a second UE capability for SBFD operation using different antenna panels of the UE for downlink reception and uplink transmission.

Aspect 7: The method of Aspect 6, wherein the first SBFD support condition indicates that SBFD operation using the same antenna panel of the UE for downlink reception and uplink transmission is not supported, supported, or supported in connection with a separation between a receive subcarrier for downlink reception and a transmit subcarrier for uplink transmission satisfying a first threshold, and wherein the second SBFD support condition indicates that SBFD operation using different antenna panels of the UE for downlink reception and uplink transmission is not supported, supported, or supported in connection with the separation between the receive subcarrier for downlink reception and the transmit subcarrier for uplink transmission satisfying a second threshold.

Aspect 8: The method of any of Aspects 1-7, wherein the one or more SBFD support conditions indicate support for SBFD operation by the UE based at least in part on at least one of a type or a priority of an uplink transmission scheduled for the UE.

Aspect 9: The method of Aspect 8, further comprising receiving downlink control information (DCI) that schedules the uplink transmission, wherein the DCI includes a priority indicator that indicates the priority of the uplink transmission, and wherein communicating with the network node based at least in part on the one or more SBFD support conditions comprises: communicating with the network node via SBFD communications in a slot in which the uplink transmission is scheduled based at least in part on the at least one of the type or the priority of the uplink transmission.

Aspect 10: The method of any of Aspects 8-9, wherein the one or more SBFD support conditions include at least one of: a first SBFD support condition that indicates whether the UE supports SBFD operation for a physical uplink control channel (PUCCH) communication associated with a first priority, a second SBFD support condition that indicates whether the UE supports SBFD operation for a PUCCH communication associated with a second priority, a third SBFD support condition that indicates whether the UE supports SBFD operation for a physical uplink shared channel (PUSCH) communication associated with the first priority, or a fourth SBFD support condition that indicates whether the UE supports SBFD operation for a PUSCH communication associated with the second priority.

Aspect 11: The method of any of Aspects 1-10, wherein the one or more SBFD support conditions include respective SBFD support conditions associated with one or more uplink or downlink transmission parameters.

Aspect 12: The method of Aspect 11, wherein the respective SBFD support conditions associated with the one or more uplink or downlink transmission parameters indicate at least one of: a maximum modulation order, for downlink transmission, uplink transmission, or downlink and uplink transmission, for which SBFD operation is supported by the UE, or a minimum coding rate, for downlink transmission, uplink transmission, or downlink and uplink transmission, for which SBFD operation is supported by the UE.

Aspect 13: The method of any of Aspects 11-12, wherein the respective SBFD support conditions associated with the one or more uplink or downlink transmission parameters indicate a maximum number of carriers on which SBFD operation is supported by the UE at a time.

Aspect 14: The method of any of Aspects 1-13, wherein communicating with the network node comprises: receiving, in a slot, a downlink communication in a receive subcarrier of a downlink sub-band; and transmitting, in the slot, an uplink communication in a transmit subcarrier of an uplink sub-band with a maximum transmit power that is based at least in part on a separation between the receive subcarrier and the transmit subcarrier.

Aspect 15: The method of Aspect 14, wherein the maximum transmit power is based at least in part on a maximum transmit power reduction determined as a function of the separation between the receive subcarrier and the transmit subcarrier.

Aspect 16: The method of Aspect 15, wherein the function is a UE-specific function, and wherein the capability information includes an indication of the UE-specific function.

Aspect 17: The method of Aspect 15, wherein the function is a non-UE-specific function, and wherein the capability information includes an indication of UE capability for SBFD operation with or without the maximum transmit power reduction.

Aspect 18: The method of any of Aspects 14-17, wherein the maximum transmit power is based at least in part on a maximum transmit power reduction determined based at least in part on different antenna panels of the UE being used for downlink reception and uplink transmission.

Aspect 19: The method of any of Aspects 1-18, further comprising: transmitting, to the network node, a request to refrain from scheduling SBFD communications for the UE.

Aspect 20: The method of any of Aspects 1-19, further comprising: refraining from performing a scheduled downlink reception or a scheduled uplink transmission in a slot based at least in part on the one or more SBFD support conditions for the UE not being satisfied.

Aspect 21: The method of any of Aspects 1-20, wherein the one or more SBFD support conditions indicate support for SBFD operation by the UE based at least in part on an uplink grant type associated with an uplink transmission scheduled for the UE.

Aspect 22: A method of wireless communication performed by a network node, comprising: receiving capability information indicating one or more sub-band full-duplex (SBFD) support conditions for a user equipment (UE); and communicating with the UE based at least in part on the one or more SBFD support conditions for the UE.

Aspect 23: The method of Aspect 22, wherein communicating with the UE based at least in part on the one or more SBFD support conditions comprises: communicating with the UE via SBFD communications in a slot in accordance with the one or more SBFD support conditions for the UE being satisfied.

Aspect 24: The method of any of Aspects 22-23, wherein the one or more SBFD support conditions indicate support for SBFD operation by the UE based at least in part on different antenna panels of the UE being used for downlink reception and uplink transmission.

Aspect 25: The method of any of Aspects 22-24, wherein the one or more SBFD support conditions indicate support for SBFD operation by the UE based at least in part on a separation between a receive subcarrier for downlink reception and a transmit subcarrier for uplink transmission satisfying a threshold.

Aspect 26: The method of any of Aspects 22-25, wherein the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE or a second threshold for downlink reception and uplink transmission using different antenna panels of the UE.

Aspect 27: The method of any of Aspects 22-26, wherein the one or more SBFD support conditions include: a first SBFD support condition that indicates a first UE capability for SBFD operation using a same antenna panel of the UE for downlink reception and uplink transmission, and a second SBFD support condition that indicates a second UE capability for SBFD operation using different antenna panels of the UE for downlink reception and uplink transmission.

Aspect 28: The method of Aspect 27, wherein the first SBFD support condition indicates that SBFD operation using the same antenna panel of the UE for downlink reception and uplink transmission is not supported, supported, or supported in connection with a separation between a receive subcarrier for downlink reception and a transmit subcarrier for uplink transmission satisfying a first threshold, and wherein the second SBFD support condition indicates that SBFD operation using different antenna panels of the UE for downlink reception and uplink transmission is not supported, supported, or supported in connection with the separation between the receive subcarrier for downlink reception and the transmit subcarrier for uplink transmission satisfying a second threshold.

Aspect 29: The method of any of Aspects 22-28, wherein the one or more SBFD support conditions indicate support for SBFD operation by the UE based at least in part on at least one of a type or a priority of an uplink transmission scheduled for the UE.

Aspect 30: The method of Aspect 29, further comprising transmitting downlink control information (DCI) that schedules the uplink transmission, wherein the DCI includes a priority indicator that indicates the priority of the uplink transmission, and wherein communicating with the UE based at least in part on the one or more SBFD support conditions comprises: communicating with the UE via SBFD communications in a slot in which the uplink transmission is scheduled based at least in part on the at least one of the type or the priority of the uplink transmission.

Aspect 31: The method of any of Aspects 29-30, wherein the one or more SBFD support conditions include at least one of: a first SBFD support condition that indicates whether the UE supports SBFD operation for a physical uplink control channel (PUCCH) communication associated with a first priority, a second SBFD support condition that indicates whether the UE supports SBFD operation for a PUCCH communication associated with a second priority, a third SBFD support condition that indicates whether the UE supports SBFD operation for a physical uplink shared channel (PUSCH) communication associated with the first priority, or a fourth SBFD support condition that indicates whether the UE supports SBFD operation for a PUSCH communication associated with the second priority.

Aspect 32: The method of any of Aspects 22-31, wherein the one or more SBFD support conditions include respective SBFD support conditions associated with one or more uplink or downlink transmission parameters.

Aspect 33: The method of Aspect 32, wherein the respective SBFD support conditions associated with the one or more uplink or downlink transmission parameters indicate at least one of: a maximum modulation order, for downlink transmission, uplink transmission, or downlink and uplink transmission, for which SBFD operation is supported by the UE, or a minimum coding rate, for downlink transmission, uplink transmission, or downlink and uplink transmission, for which SBFD operation is supported by the UE.

Aspect 34: The method of any of Aspects 32-33, wherein the respective SBFD support conditions associated with the one or more uplink or downlink transmission parameters indicate a maximum number of carriers on which SBFD operation is supported by the UE at a time.

Aspect 35: The method of any of Aspects 22-34, wherein communicating with the UE comprises: transmitting, in a slot, a downlink communication to the UE in a receive subcarrier of a downlink sub-band; and receiving, in the slot, an uplink communication from the UE in a transmit subcarrier of an uplink sub-band, wherein the uplink communication is transmitted with a maximum transmit power that is based at least in part on a separation between the receive subcarrier and the transmit subcarrier.

Aspect 36: The method of Aspect 35, wherein the maximum transmit power is based at least in part on a maximum transmit power reduction determined as a function of the separation between the receive subcarrier and the transmit subcarrier.

Aspect 37: The method of Aspect 36, wherein the function is a UE-specific function, and wherein the capability information includes an indication of the UE-specific function.

Aspect 38: The method of Aspect 36, wherein the function is a non-UE-specific function, and wherein the capability information includes an indication of UE capability for SBFD operation with or without the maximum transmit power reduction.

Aspect 39: The method of any of Aspects 35-38, wherein the maximum transmit power is based at least in part on a maximum transmit power reduction determined based at least in part on different antenna panels of the UE being used for downlink reception and uplink transmission.

Aspect 40: The method of any of Aspects 22-39, further comprising: receiving, from the UE, a request to refrain from scheduling SBFD communications for the UE; and refraining from scheduling SBFD communications for the UE based at least in part on the request.

Aspect 41: The method of any of Aspects 22-40, wherein the one or more SBFD support conditions indicate support for SBFD operation by the UE based at least in part on an uplink grant type associated with an uplink transmission scheduled for the UE.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

transmit, to a network node, capability information indicating one or more sub-band full-duplex (SBFD) support conditions for the UE, wherein the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE and a second threshold for downlink reception and uplink transmission using different antenna panels of the UE; and communicate with the network node based at least in part on the one or more SBFD support conditions for the UE.

2. The UE of claim 1, wherein the one or more processors, to communicate with the network node based at least in part on the one or more SBFD support conditions, are configured to:

communicate with the network node via SBFD communications in a slot in accordance with the one or more SBFD support conditions for the UE being satisfied.

3. The UE of claim 1, wherein the one or more SBFD support conditions indicate support for SBFD operation by the UE based at least in part on different antenna panels of the UE being used for downlink reception and uplink transmission.

4. The UE of claim 1, wherein the one or more SBFD support conditions indicate support for SBFD operation by the UE based at least in part on a separation between a receive subcarrier for downlink reception and a transmit subcarrier for uplink transmission satisfying a threshold.

5. The UE of claim 1, wherein the one or more SBFD support conditions include:

a first SBFD support condition that indicates a first UE capability for SBFD operation using a same antenna panel of the UE for downlink reception and uplink transmission, and a second SBFD support condition that indicates a second UE capability for SBFD operation using different antenna panels of the UE for downlink reception and uplink transmission.

6. The UE of claim 5, wherein the first SBFD support condition indicates that SBFD operation using the same antenna panel of the UE for downlink reception and uplink transmission is not supported, supported, or supported in connection with a separation between a receive subcarrier for downlink reception and a transmit subcarrier for uplink transmission satisfying a first threshold, and wherein the second SBFD support condition indicates that SBFD operation using different antenna panels of the UE for downlink reception and uplink transmission is not supported, supported, or supported in connection with the separation between the receive subcarrier for downlink reception and the transmit subcarrier for uplink transmission satisfying a second threshold.

7. The UE of claim 1, wherein the one or more SBFD support conditions indicate support for SBFD operation by the UE based at least in part on at least one of a type or a priority of an uplink transmission scheduled for the UE.

8. The UE of claim 7, wherein the one or more processors are further configured to receive downlink control information (DCI) that schedules the uplink transmission, wherein the DCI includes a priority indicator that indicates the priority of the uplink transmission, and wherein the one or more processors, to communicate with the network node based at least in part on the one or more SBFD support conditions, are configured to:

communicate with the network node via SBFD communications in a slot in which the uplink transmission is scheduled based at least in part on the at least one of the type or the priority of the uplink transmission.

9. The UE of claim 7, wherein the one or more SBFD support conditions include at least one of:

a first SBFD support condition that indicates whether the UE supports SBFD operation for a physical uplink control channel (PUCCH) communication associated with a first priority, a second SBFD support condition that indicates whether the UE supports SBFD operation for a PUCCH communication associated with a second priority, a third SBFD support condition that indicates whether the UE supports SBFD operation for a physical uplink shared channel (PUSCH) communication associated with the first priority, or a fourth SBFD support condition that indicates whether the UE supports SBFD operation for a PUSCH communication associated with the second priority.

10. The UE of claim 1, wherein the one or more SBFD support conditions include respective SBFD support conditions associated with one or more uplink or downlink transmission parameters.

11. The UE of claim 10, wherein the respective SBFD support conditions associated with the one or more uplink or downlink transmission parameters indicate at least one of:

a maximum modulation order, for downlink transmission, uplink transmission, or downlink and uplink transmission, for which SBFD operation is supported by the UE, or a minimum coding rate, for downlink transmission, uplink transmission, or downlink and uplink transmission, for which SBFD operation is supported by the UE.

12. The UE of claim 10, wherein the respective SBFD support conditions associated with the one or more uplink or downlink transmission parameters indicate a maximum number of carriers on which SBFD operation is supported by the UE at a time.

13. The UE of claim 1, wherein the one or more processors, to communicate with the network node, are configured to:

receive, in a slot, a downlink communication in a receive subcarrier of a downlink sub-band; and transmit, in the slot, an uplink communication in a transmit subcarrier of an uplink sub-band with a maximum transmit power that is based at least in part on a separation between the receive subcarrier and the transmit subcarrier.

14. The UE of claim 13, wherein the maximum transmit power is based at least in part on a maximum transmit power reduction determined as a function of the separation between the receive subcarrier and the transmit subcarrier.

15. The UE of claim 14, wherein the function is a UE-specific function, and wherein the capability information includes an indication of the UE-specific function.

16. The UE of claim 14, wherein the function is a non-UE-specific function, and wherein the capability information includes an indication of UE capability for SBFD operation with or without the maximum transmit power reduction.

17. The UE of claim 13, wherein the maximum transmit power is based at least in part on a maximum transmit power reduction determined based at least in part on different antenna panels of the UE being used for downlink reception and uplink transmission.

18. The UE of claim 1, wherein the one or more processors are further configured to:

transmit, to the network node, a request to refrain from scheduling SBFD communications for the UE.

19. The UE of claim 1, wherein the one or more processors are further configured to:

refrain from performing a scheduled downlink reception or a scheduled uplink transmission in a slot based at least in part on the one or more SBFD support conditions for the UE not being satisfied.

20. The UE of claim 1, wherein the one or more SBFD support conditions indicate support for SBFD operation by the UE based at least in part on an uplink grant type associated with an uplink transmission scheduled for the UE.

21. A network node for wireless communication, comprising:

one or more memories; and one or more processors, coupled to the one or more memories, configured to:

receive capability information indicating one or more sub-band full-duplex (SBFD) support conditions for a user equipment (UE), wherein the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE and a second threshold for downlink reception and uplink transmission using different antenna panels of the UE; and communicate with the UE based at least in part on the one or more SBFD support conditions for the UE.

22. The network node of claim 21, wherein the one or more SBFD support conditions indicate support for SBFD operation by the UE based at least in part on at least one of a type or a priority of an uplink transmission scheduled for the UE.

23. A method of wireless communication performed by a user equipment (UE), comprising:

transmitting, to a network node, capability information indicating one or more sub-band full-duplex (SBFD) support conditions for the UE, wherein the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE and a second threshold for downlink reception and uplink transmission using different antenna panels of the UE; and communicating with the network node based at least in part on the one or more SBFD support conditions for the UE.

24. The method of claim 23, wherein communicating with the network node based at least in part on the one or more SBFD support conditions comprises:

communicating with the network node via SBFD communications in a slot in accordance with the one or more SBFD support conditions for the UE being satisfied.

25. The method of claim 23, wherein the one or more SBFD support conditions indicate support for SBFD operation by the UE based at least in part on different antenna panels of the UE being used for downlink reception and uplink transmission.

26. The method of claim 23, wherein the one or more SBFD support conditions indicate support for SBFD operation by the UE based at least in part on a separation between a receive subcarrier for downlink reception and a transmit subcarrier for uplink transmission satisfying a threshold.

27. The method of claim 23, wherein the one or more SBFD support conditions indicate support for SBFD operation by the UE based at least in part on at least one of a type or a priority of an uplink transmission scheduled for the UE.

28. The method of claim 23, wherein the one or more SBFD support conditions include respective SBFD support conditions associated with one or more uplink or downlink transmission parameters.

29. The method of claim 23, wherein communicating with the network node comprises:

receiving, in a slot, a downlink communication in a receive subcarrier of a downlink sub-band; and transmitting, in the slot, an uplink communication in a transmit subcarrier of an uplink sub-band with a maximum transmit power that is based at least in part on a separation between the receive subcarrier and the transmit subcarrier.

30. A method of wireless communication performed by a network node, comprising:

receiving capability information indicating one or more sub-band full-duplex (SBFD) support conditions for a user equipment (UE), wherein the one or more SBFD support conditions indicate support for SBFD operation by the UE based at least in part on a separation between a receive subcarrier for downlink reception and a transmit subcarrier for uplink transmission satisfying a first threshold for downlink reception and uplink transmission using a same antenna panel of the UE and a second threshold for downlink reception and uplink transmission using different antenna panels of the UE; and communicating with the UE based at least in part on the one or more SBFD support conditions for the UE.

* * * * *